United States Patent
Thiyagarajah

(10) Patent No.: US 7,546,950 B2
(45) Date of Patent: Jun. 16, 2009

(54) METHOD AND APPARATUS FOR LOCATING AND DECODING A TWO-DIMENSIONAL MACHINE-READABLE SYMBOL

(75) Inventor: Mohanaraj Thiyagarajah, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 571 days.

(21) Appl. No.: 11/390,653

(22) Filed: Mar. 28, 2006

(65) Prior Publication Data

US 2007/0228171 A1 Oct. 4, 2007

(51) Int. Cl.
*G06K 9/18* (2006.01)

(52) U.S. Cl. .............. 235/462.09; 235/462.08; 235/462.07; 235/462.1; 235/462.11

(58) Field of Classification Search ............ 235/462.09, 235/462.1, 462.01, 462.08, 462.07, 462.11
See application file for complete search history.

(56) References Cited

U.S. PATENT DOCUMENTS

| | | | |
|---|---|---|---|
| 6,267,296 B1 | 7/2001 | Ooshima et al. | |
| 6,279,830 B1 | 8/2001 | Ishibashi | |
| 6,302,329 B1 | 10/2001 | Iwai et al. | |
| 6,685,095 B2 * | 2/2004 | Roustaei et al. | ........ 235/472.01 |
| 6,729,542 B2 | 5/2004 | Iwai et al. | |
| 6,758,399 B1 | 7/2004 | Brunelli et al. | |
| 6,775,409 B1 | 8/2004 | Brunelli et al. | |
| 6,786,412 B2 | 9/2004 | Shimizu | |
| 7,299,989 B2 * | 11/2007 | Schuessler | ................. 235/484 |
| 2003/0009725 A1 | 1/2003 | Reichenbach | |
| 2003/0072489 A1 | 4/2003 | Reichenbach et al. | |
| 2004/0020989 A1 | 2/2004 | Muramatsu | |

* cited by examiner

*Primary Examiner*—Edwyn Labaze

(57) ABSTRACT

A method of locating and decoding a two-dimensional machine-readable symbol in a digital image, where the symbol has three finder patterns adjacent respective corners of the symbol, takes into account the possibility of skew and pitch when delineating the symbol in the digital image by estimating the unknown fourth corner based on lines passing through known symbol edge points. On the basis of the delineating, a reference grid is mapped to the digital image and a bit stream is extracted based on the mapping.

17 Claims, 25 Drawing Sheets

FIG. 30
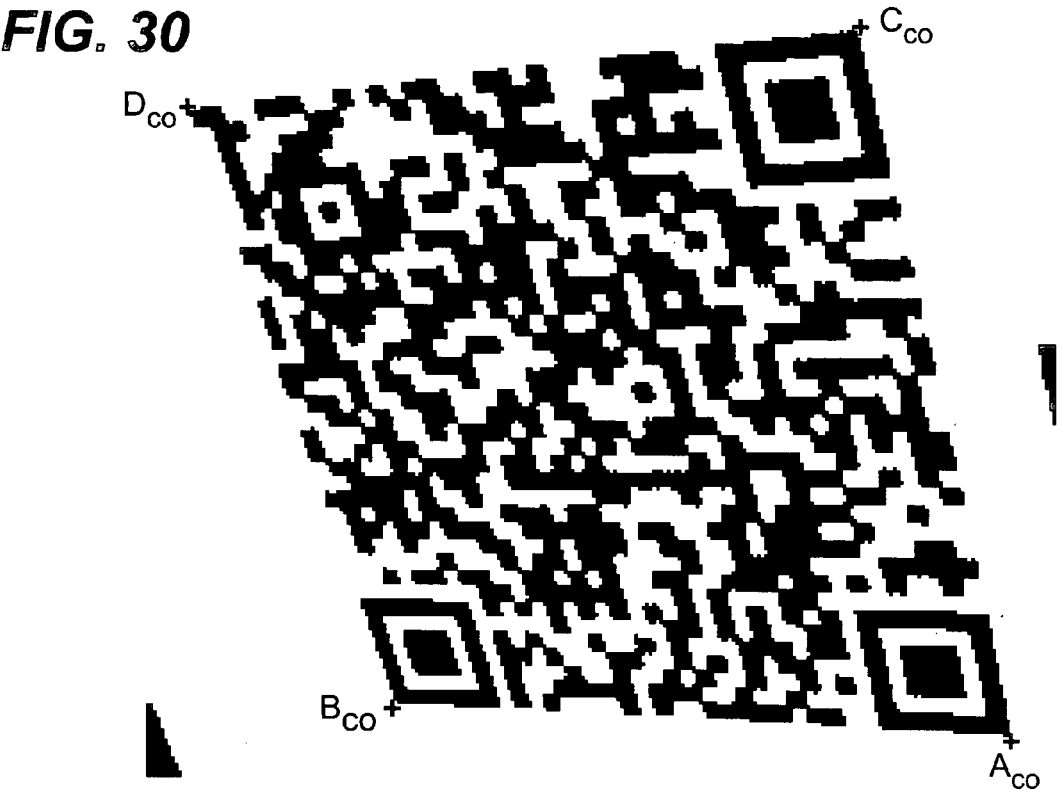
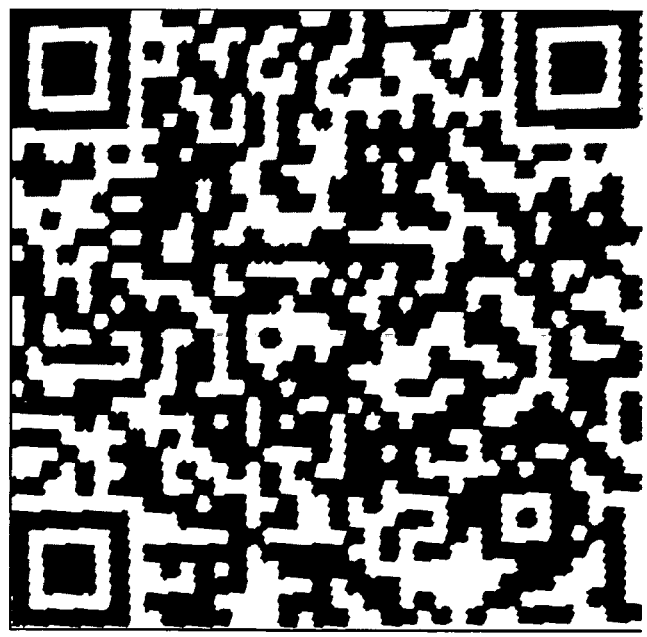
FIG. 31

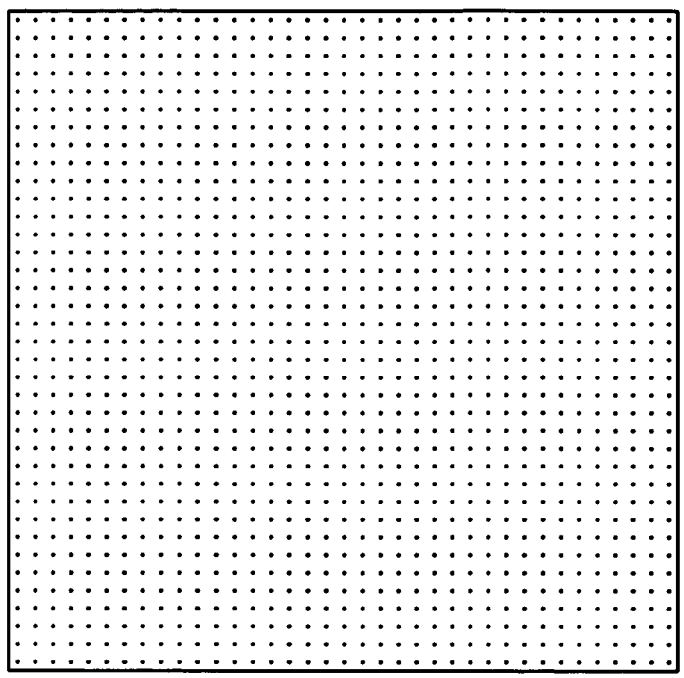
FIG. 32
FIG. 33
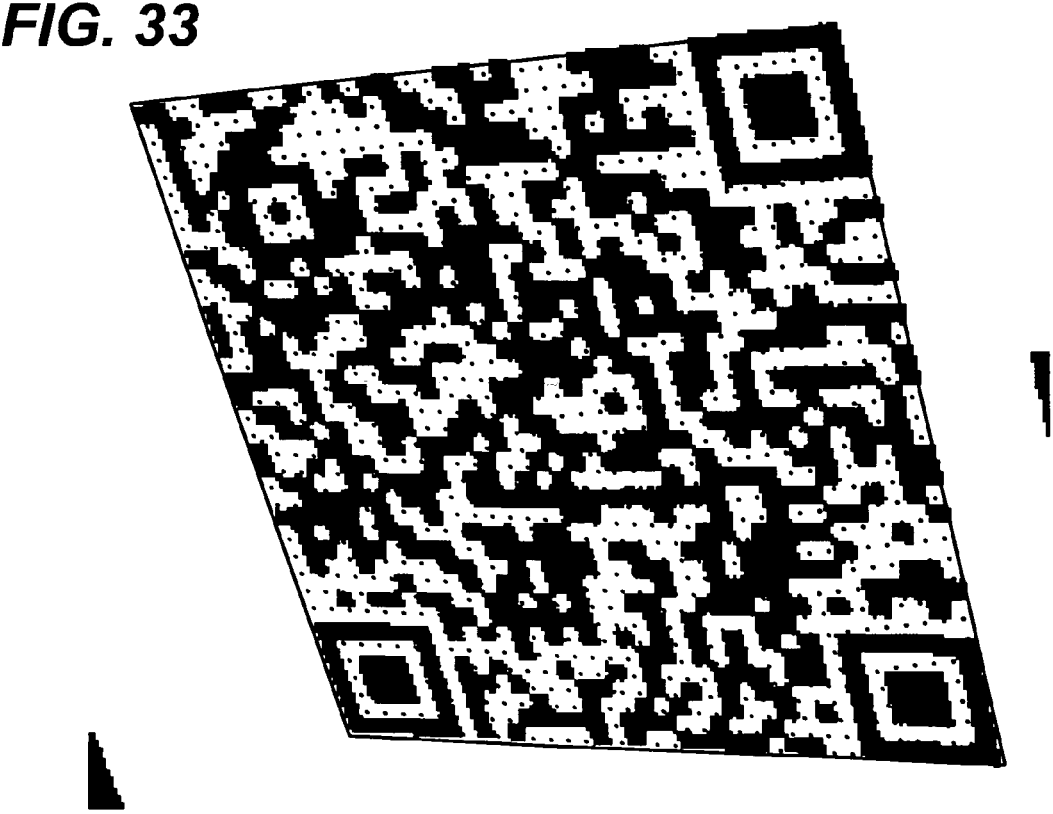

BOLD TEXT - Function Patterns
ITALIC TEXT - Format Information
PLAIN TEXT - Data and Error Correction Codewords

BOLD TEXT - Function Patterns
ITALIC TEXT - Format Information
PLAIN TEXT - Data and Error Correction Codewords

| Bits | Decoded Data | Bits | Decoded Data |
|---|---|---|---|
| 0100 | Mode Indicator - *8-Bit Byte* | 00110000 | Character Count Indicator - *48* |
| 01001100 | L | 01010110 | V |
| 01010100 | T | 01010100 | T |
| 01001100 | L | 00101100 | , |
| 00100000 | SPACE | 01001100 | L |
| 01010110 | V | 01000011 | C |
| 01001101 | M | 01001111 | O |
| 01010011 | S | 00101100 | , |
| 00100000 | SPACE | 01010000 | P |
| 01000011 | C | 01001001 | I |
| 00101100 | , | 00100000 | SPACE |
| 01010000 | P | 01000011 | C |
| 01001001 | I | 00101101 | - |
| 01011000 | X | 00101100 | , |
| 00100000 | SPACE | 01000111 | G |
| 01010100 | T | 01001100 | L |
| 00101100 | , | 00100000 | SPACE |
| 01000111 | G | 01010100 | T |
| 01001100 | L | 01010000 | P |
| 00101100 | , | 00100000 | SPACE |
| 01001000 | H | 01010011 | S |
| 01010100 | T | 01001100 | L |
| 00101100 | , | 00100000 | SPACE |
| 01010011 | S | 01010011 | S |
| 01010100 | T | 01001100 | L |
| 0000 | Terminator | 11101100 | pad |
| 00010001 | pad | 11101100 | pad |
| 00010001 | pad | 11101100 | pad |
| 00010001 | pad | 11101100 | pad |
| 00010001 | pad | 11101100 | pad |
| 00010001 | pad | 11101100 | pad |
| 00010001 | pad | | |

| $i$ | $\alpha^i$ | $\alpha^i$ | $i$ | $\alpha^i$ | $\alpha^i$ |
|---|---|---|---|---|---|
| 0 | 00000001 | 1 | 51 | 00001010 | 10 |
| 1 | 00000010 | 2 | 52 | 00010100 | 20 |
| 2 | 00000100 | 4 | 53 | 00101000 | 40 |
| 3 | 00001000 | 8 | 54 | 01010000 | 80 |
| 4 | 00010000 | 16 | 55 | 10100000 | 160 |
| 5 | 00100000 | 32 | 56 | 01011101 | 93 |
| 6 | 01000000 | 64 | 57 | 10111010 | 186 |
| 7 | 10000000 | 128 | 58 | 01101001 | 105 |
| 8 | 00011101 | 29 | 59 | 11010010 | 210 |
| 9 | 00111010 | 58 | 60 | 10111001 | 185 |
| 10 | 01110100 | 116 | 61 | 01101111 | 111 |
| 11 | 11101000 | 232 | 62 | 11011110 | 222 |
| 12 | 11001101 | 205 | 63 | 10100001 | 161 |
| 13 | 10000111 | 135 | 64 | 01011111 | 95 |
| 14 | 00010011 | 19 | 65 | 10111110 | 190 |
| 15 | 00100110 | 38 | 66 | 01100001 | 97 |
| 16 | 01001100 | 76 | 67 | 11000010 | 194 |
| 17 | 10011000 | 152 | 68 | 10011001 | 153 |
| 18 | 00101101 | 45 | 69 | 00101111 | 47 |
| 19 | 01011010 | 90 | 70 | 01011110 | 94 |
| 20 | 10110100 | 180 | 71 | 10111100 | 188 |
| 21 | 01110101 | 117 | 72 | 01100101 | 101 |
| 22 | 11101010 | 234 | 73 | 11001010 | 202 |
| 23 | 11001001 | 201 | 74 | 10001001 | 137 |
| 24 | 10001111 | 143 | 75 | 00001111 | 15 |
| 25 | 00000011 | 3 | 76 | 00011110 | 30 |
| 26 | 00000110 | 6 | 77 | 00111100 | 60 |
| 27 | 00001100 | 12 | 78 | 01111000 | 120 |
| 28 | 00011000 | 24 | 79 | 11110000 | 240 |
| 29 | 00110000 | 48 | 80 | 11111101 | 253 |
| 30 | 01100000 | 96 | 81 | 11100111 | 231 |
| 31 | 11000000 | 192 | 82 | 11010011 | 211 |
| 32 | 10011101 | 157 | 83 | 10111011 | 187 |
| 33 | 00100111 | 39 | 84 | 01101011 | 107 |
| 34 | 01001110 | 78 | 85 | 11010110 | 214 |
| 35 | 10011100 | 156 | 86 | 10110001 | 177 |
| 36 | 00100101 | 37 | 87 | 01111111 | 127 |
| 37 | 01001010 | 74 | 88 | 11111110 | 254 |
| 38 | 10010100 | 148 | 89 | 11100001 | 225 |
| 39 | 00110101 | 53 | 90 | 11011111 | 223 |
| 40 | 01101010 | 106 | 91 | 10100011 | 163 |
| 41 | 11010100 | 212 | 92 | 01011011 | 91 |
| 42 | 10110101 | 181 | 93 | 10110110 | 182 |
| 43 | 01110111 | 119 | 94 | 01110001 | 113 |
| 44 | 11101110 | 238 | 95 | 11100010 | 226 |
| 45 | 11000001 | 193 | 96 | 11011001 | 217 |
| 46 | 10011111 | 159 | 97 | 10101111 | 175 |
| 47 | 00100011 | 35 | 98 | 01000011 | 67 |
| 48 | 01000110 | 70 | 99 | 10000110 | 134 |
| 49 | 10001100 | 140 | 100 | 00010001 | 17 |
| 50 | 00000101 | 5 | 101 | 00100010 | 34 |

FIG. 40B

| i | α^i | α^i | i | α^i | α^i | i | α^i | α^i |
|---|---|---|---|---|---|---|---|---|
| 102 | 01000100 | 68 | 153 | 10010010 | 146 | 204 | 11011101 | 221 |
| 103 | 10001000 | 136 | 154 | 00111001 | 57 | 205 | 10100111 | 167 |
| 104 | 00001101 | 13 | 155 | 01110010 | 114 | 206 | 01010011 | 83 |
| 105 | 00011010 | 26 | 156 | 11100100 | 228 | 207 | 10100110 | 166 |
| 106 | 00110100 | 52 | 157 | 11010101 | 213 | 208 | 01010001 | 81 |
| 107 | 01101000 | 104 | 158 | 10110111 | 183 | 209 | 10100010 | 162 |
| 108 | 11010000 | 208 | 159 | 01110011 | 115 | 210 | 01011001 | 89 |
| 109 | 10111101 | 189 | 160 | 11100110 | 230 | 211 | 10110010 | 178 |
| 110 | 01100111 | 103 | 161 | 11010001 | 209 | 212 | 01111001 | 121 |
| 111 | 11001110 | 206 | 162 | 10111111 | 191 | 213 | 11110010 | 242 |
| 112 | 10000001 | 129 | 163 | 01100011 | 99 | 214 | 11111001 | 249 |
| 113 | 00011111 | 31 | 164 | 11000110 | 198 | 215 | 11101111 | 239 |
| 114 | 00111110 | 62 | 165 | 10010001 | 145 | 216 | 11000011 | 195 |
| 115 | 01111100 | 124 | 166 | 00111111 | 63 | 217 | 10011011 | 155 |
| 116 | 11111000 | 248 | 167 | 01111110 | 126 | 218 | 00101011 | 43 |
| 117 | 11101101 | 237 | 168 | 11111100 | 252 | 219 | 01010110 | 86 |
| 118 | 11000111 | 199 | 169 | 11100101 | 229 | 220 | 10101100 | 172 |
| 119 | 10010011 | 147 | 170 | 11010111 | 215 | 221 | 01000101 | 69 |
| 120 | 00111011 | 59 | 171 | 10110011 | 179 | 222 | 10001010 | 138 |
| 121 | 01110110 | 118 | 172 | 01111011 | 123 | 223 | 00001001 | 9 |
| 122 | 11101100 | 236 | 173 | 11110110 | 246 | 224 | 00010010 | 18 |
| 123 | 11000101 | 197 | 174 | 11110001 | 241 | 225 | 00100100 | 36 |
| 124 | 10010111 | 151 | 175 | 11111111 | 255 | 226 | 01001000 | 72 |
| 125 | 00110011 | 51 | 176 | 11100011 | 227 | 227 | 10010000 | 144 |
| 126 | 01100110 | 102 | 177 | 11011011 | 219 | 228 | 00111101 | 61 |
| 127 | 11001100 | 204 | 178 | 10101011 | 171 | 229 | 01111010 | 122 |
| 128 | 10000101 | 133 | 179 | 01001011 | 75 | 230 | 11110100 | 244 |
| 129 | 00010111 | 23 | 180 | 10010110 | 150 | 231 | 11110101 | 245 |
| 130 | 00101110 | 46 | 181 | 00110001 | 49 | 232 | 11110111 | 247 |
| 131 | 01011100 | 92 | 182 | 01100010 | 98 | 233 | 11110011 | 243 |
| 132 | 10111000 | 184 | 183 | 11000100 | 196 | 234 | 11111011 | 251 |
| 133 | 01101101 | 109 | 184 | 10010101 | 149 | 235 | 11101011 | 235 |
| 134 | 11011010 | 218 | 185 | 00110111 | 55 | 236 | 11001011 | 203 |
| 135 | 10101001 | 169 | 186 | 01101110 | 110 | 237 | 10001011 | 139 |
| 136 | 01001111 | 79 | 187 | 11011100 | 220 | 238 | 00001011 | 11 |
| 137 | 10011110 | 158 | 188 | 10100101 | 165 | 239 | 00010110 | 22 |
| 138 | 00100001 | 33 | 189 | 01010111 | 87 | 240 | 00101100 | 44 |
| 139 | 01000010 | 66 | 190 | 10101110 | 174 | 241 | 01011000 | 88 |
| 140 | 10000100 | 132 | 191 | 01000001 | 65 | 242 | 10110000 | 176 |
| 141 | 00010101 | 21 | 192 | 10000010 | 130 | 243 | 01111101 | 125 |
| 142 | 00101010 | 42 | 193 | 00011001 | 25 | 244 | 11111010 | 250 |
| 143 | 01010100 | 84 | 194 | 00110010 | 50 | 245 | 11101001 | 233 |
| 144 | 10101000 | 168 | 195 | 01100100 | 100 | 246 | 11001111 | 207 |
| 145 | 01001101 | 77 | 196 | 11001000 | 200 | 247 | 10000011 | 131 |
| 146 | 10011010 | 154 | 197 | 10001101 | 141 | 248 | 00011011 | 27 |
| 147 | 00101001 | 41 | 198 | 00000111 | 7 | 249 | 00110110 | 54 |
| 148 | 01010010 | 82 | 199 | 00001110 | 14 | 250 | 01101100 | 108 |
| 149 | 10100100 | 164 | 200 | 00011100 | 28 | 251 | 11011000 | 216 |
| 150 | 01010101 | 85 | 201 | 00111000 | 56 | 252 | 10101101 | 173 |
| 151 | 10101010 | 170 | 202 | 01110000 | 112 | 253 | 01000111 | 71 |
| 152 | 01001001 | 73 | 203 | 11100000 | 224 | 254 | 10001110 | 142 |

METHOD AND APPARATUS FOR LOCATING AND DECODING A TWO-DIMENSIONAL MACHINE-READABLE SYMBOL

FIELD OF THE INVENTION

The methods and systems disclosed herein relate generally to symbol recognition and more specifically, to a method, apparatus and computer program for locating and decoding a two-dimensional machine-readable symbol in a digital image.

BACKGROUND OF THE INVENTION

Marking documents with machine-readable characters to facilitate automatic document recognition using character recognition systems is well known in the art. In many industries, labels are printed with machine-readable symbols, often referred to as barcodes, and are applied to packages and parcels. The machine-readable symbols on the labels typically carry information concerning the packages and parcels that is not otherwise evident from the packages and parcels themselves.

For example, one-dimensional barcode symbols, such as those following the well-known Universal Product Code (UPC) specification, regulated by the Uniform Code Council, are commonly used on machine-readable labels due to their simplicity. A number of other one-dimensional barcode symbol specifications have also been proposed, such as for example POSTNET that is used to represent ZIP codes. In each case, the one-dimensional barcode symbols governed by these specifications have optimizations suited for their particular use. Although these one-dimensional barcode symbols are easily scanned and decoded, they suffer disadvantages in that they are only capable of encoding a limited amount of information.

To overcome the disadvantages associated with one-dimensional barcode symbols, two-dimensional machine-readable symbols have been developed to allow significantly larger amounts of information to be encoded. For example, the AIM Uniform Symbology Specification For PDF417 defines a two-dimensional barcode symbol format that allows each barcode symbol to encode and compress up to 1108 bytes of information. Information encoded and compressed in each barcode symbol is organized into a two-dimensional data matrix including between 3 and 90 rows of data that is book-ended by start and stop patterns. Other two-dimensional machine-readable symbol formats such as, for example, AZTEC, QR-Code and MaxiCode have also been considered.

Although two-dimensional machine-readable symbols allow larger amounts of information to be encoded, an increase in sophistication is required in order to read and decode such two-dimensional symbols. In fact decoding two-dimensional symbols often requires relatively large amounts of computation. As a result, it is desired to ensure that two-dimensional symbols are read properly before the decoding process commences. This is particularly important in high-volume environments.

To ensure that two-dimensional symbols are in fact read properly, finder patterns are commonly embedded in two-dimensional machine-readable symbols. The finder patterns allow the two-dimensional symbols to be correctly delineated and oriented so that the data encoded in the two-dimensional symbols can be properly extracted and decoded. For example, SR-Code makes use of square symbols, each comprising a grid of black or white square modules, and having three square finder patterns positioned at respective ones of the bottom left, top left and top right corners of the symbol. Each finder pattern consists of a solid square of black modules surrounded by a square ring of white modules, which is in turn surrounded by a square ring of black modules. The outward-facing sides of the square ring of black modules form a symbol corner. Additional lines of white modules border the inward-facing sides of the square ring of black modules to separate the finder pattern from the data encoded in the symbol.

Depending on the environment and the scanning equipment used to capture images of the two-dimensional symbols being read, the ease by which finder patterns are located in captured images can vary significantly. As a result, a number of techniques for locating finder patterns and decoding two-dimensional symbols have been considered.

For example, U.S. Patent Application Publication No. 2004/0020989 to Muramatsu discloses a method for reading a QR-Code symbol. According to this method, each read QR-Code symbol is searched for an approximate 1:1:3:1:1 run of black and white pixels in horizontal, vertical and inclined directions and candidate finder pattern origins are accorded respective evaluation values. The lengths of the candidate finder pattern runs are calculated and an error between the 1:1:3:1:1 standard run is calculated. Those runs with an error above a predetermined threshold are deleted as candidates. Those runs with the smallest errors are given a higher evaluation. Center coordinates of the evaluation finder patterns are determined by comparing the widths and centers of proximate finder pattern candidates. From these comparisons, highest evaluation finder patterns are located and their center coordinates determined. The cell size is determined from the finder patterns by dividing the average finder pattern width by seven (7).

The orientation of the QR-Code symbol is determined by first linking the finder patterns' center coordinates to form a triangle, and deeming the coordinate not on the longest line of the triangle as the top left finder pattern. The bottom left and top right finder patterns are oriented by dividing the space around the top left finder pattern into quadrants, and determining in which adjacent quadrants, relative to the top left finder pattern, the other two finder patterns are located.

The alignment pattern is located by first detecting the rotational angle of the QR-Code symbol from the finder pattern and finding the intersection point of lines from the centers of the top right and bottom left finder patterns parallel to respective edges of the symbol. The center of the alignment pattern is considered to be three (3) cells inward (i.e. towards the top left finder pattern) from the intersection point. To confirm the alignment pattern, a 5×5 template is compared to a retrieval range having a center at the deemed alignment pattern center. Matching is conducted by summing absolute values of differences between the pixel values of all of the pixels forming the template and the pixel values of pixels in the retrieval range. Sequentially shifting one pixel over all pixels in the retrieval range to determine minimum differences in pixel values enables a more accurate determination of the alignment pattern center.

The version of the QR-Code symbol is determined by calculating the number of cells between finder patterns. A quotient is obtained by dividing the average of the distances between the finder patterns by the cell size determined as described above from the pattern width. A light/dark threshold is calculated by finding the maximum and minimum pixel values along a line connecting the top right and bottom left finder patterns, and averaging the two. A conversion coefficient is then calculated for converting points from a standard QR-Code symbol to an input image. A linear interpolation of four adjacent pixels to the determined center of a cell is conducted to calculate a pixel value at the module center.

U.S. Pat. No. 6,758,399 to Brunelli et al. discloses a method of detecting an optical code such as a QR-Code symbol, and correcting for distortion. The method first determines a binary threshold value and finds regions of interest by locating areas with high-brightness variations. It is assumed that the symbol orientation is known, and the vertices are located using the methods outlined in the AIM Global International Symbology Specification for QR-Code. Using the located vertices, the optical code is localized and extracted from the image for further processing. At this point, the timing patterns and number of symbol elements are located in the optical code. Based on the number of symbol elements, an ideal grid is generated and a transformation between the ideal grid and the input symbol is calculated. From the location of the transformed vertices of the ideal grid, brightness values are acquired and binarized using the threshold value.

Although the above references disclose methods of locating and extracting data from QR-Code symbols in a digital image, symbol orientation is either taken for granted or computationally expensive. Furthermore, these disclosed methods do not address situations in which the symbol is either skewed or pitched in the digital image. It is therefore an object of the invention to provide a novel method and apparatus for locating and decoding two-dimensional symbols in digital image.

SUMMARY OF THE INVENTION

In accordance with an aspect, there is provided a method of extracting a bitstream from a machine-readable symbol in an image, the symbol comprising three finder patterns adjacent respective corners of the symbol and generally defining the corners of a right-angled triangle, the method comprising:

identifying the finder patterns in the symbol;

orienting the symbol using the finder patterns, the orienting comprising determining which of the three finder patterns is positioned at the corner of the triangle opposite its hypotenuse ("top left finder pattern"), and labeling the remaining two finder patterns based on the relative distance between the remaining two finder patterns that would result if one of the remaining two finder patterns were rotated about the top left finder pattern less than 180 degrees;

on the basis of the orienting, delineating the symbol;

mapping a decoding grid to the delineated symbol; and extracting bit values from the mapped symbol.

During the labeling, the remaining two finder patterns are initially labeled respectively as top right and bottom left finder patterns. A selected one of the top right and bottom left finder patterns is rotated about the top left finder pattern. After rotation, the relative distance between the top right and bottom left finder patterns before and after rotation are compared to verify the initial labeling. If the comparing does not verify the initial labeling, the labeling of the remaining two finder patterns is reversed.

In one embodiment, the determining comprises establishing a plurality of line segments each extending between corresponding points on each of the finder patterns. The top left finder pattern is identified as the finder pattern that is common to the corresponding points having line segments extending over only white pixels. The image may be tokenized into black or white tokens, and the finder pattern common to two of the line segments that pass through only one white token identified as the top left finder pattern.

The delineating may comprises determining the top left, bottom left, and top right corners based on the top left, bottom left and top right finder patterns and using a skew and pitch sensitive technique based on the top right and bottom left finder patterns to determine the bottom right corner of the symbol.

The skew and pitch sensitive technique may comprise determining bottom and right side symbol edge points adjacent the bottom right corner of the symbol. The intersection of a line extending from the bottom left finder pattern through the bottom symbol edge point and a line extending from the top right finder pattern through the ride side symbol edge point is determined thereby to determine the bottom right symbol corner.

In accordance with another aspect, there is provided a method of determining orientation of a machine-readable symbol in an image, the symbol comprising three finder patterns adjacent respective corners of the symbol and generally defining the corners of a right-angled triangle, the method comprising:

identifying the finder pattern that is positioned at the corner of the triangle opposite its hypotenuse ("top left finder pattern"); and labeling the remaining two finder patterns based on the relative distance between the remaining two finder patterns that would result if one of the remaining two finder patterns were rotated about the top left finder pattern less than 180 degrees.

In accordance with yet another aspect, there is provided a method of determining orientation of a machine-readable symbol in an image, the symbol comprising three finder patterns in respective corners of the symbol, the method comprising:

calculating respective lengths of line segments extending between center points of each of the three finder patterns;

labeling the top left finder pattern as the finder pattern common to the two line segments whose squared length sum equals the square of the length of the third line segment; and labeling the remaining two finder patterns based on the relative distance between the remaining two finder patterns that would result if one of the remaining two finder patterns were rotated about the top left finder pattern less than 180 degrees.

In accordance with yet another aspect, there is provided a method of estimating the location of a fourth corner of a two-dimensional machine-readable symbol in an image, wherein the symbol comprises top left, top right and bottom left finder patterns adjacent top left, top right and bottom left corners of the symbol, the method comprising:

determining a first inside edge line that is collinear with the inside edge of the bottom left finder pattern that faces the top left finder pattern;

determining a second inside edge line that is collinear with the inside edge of the top right finder pattern that faces the top left finder pattern;

determining a first midpoint of the outside edge of the bottom left finder pattern that is opposite the inside edge of the bottom left finder pattern;

determining a second midpoint of the outside edge of the top right finder pattern that is opposite the inside edge of the top right finder pattern;

determining a first outside edge point along the first inside edge line that coincides with an outside edge of the symbol;

determining a second outside edge point along the second inside edge line that coincides with an outside edge of the symbol;

determining a first outside edge line passing through the first midpoint and the second outside edge point;

determining a second outside edge line passing through the second midpoint and the first outside edge point; and declaring the intersection of the first outside edge line and the second outside edge line to be the bottom right corner.

In accordance with yet another aspect, there is provided an apparatus for extracting a bitstream from a machine-readable symbol in an image, the symbol comprising three square finder patterns adjacent respective corners of the symbol and generally defining the corners of a right-angled triangle, the apparatus comprising:

a finder pattern identifier identifying the finder patterns in the symbol;

a symbol orientor orienting the symbol using the finder patterns, the orienting comprising determining which of the three finder patterns is positioned at the corner of the triangle opposite its hypotenuse ("top left finder pattern"), and labeling the remaining two finder patterns based on the relative distance between the remaining two finder patterns that would result if one of the remaining two finder patterns were rotated about the top left finder pattern less than 180 degrees;

a symbol delineator for, on the basis of the orienting, delineating the symbol;

a reference grid calculator for mapping a reference decoding grid to the delineated symbol; and a bit extractor for extracting bit values from the mapped symbol.

In accordance with still yet another aspect, there is provided an apparatus for determining orientation of a machine-readable symbol in an image, the symbol comprising three finder patterns adjacent respective corners of the symbol and generally defining the corners of a right-angled triangle, the apparatus comprising:

a line segment generator establishing a plurality of line segments each extending between corresponding points on each of the finder patterns; and a symbol orientor identifying the finder pattern that is positioned at the corner of the triangle opposite its hypotenuse ("top left finder pattern"), the symbol orientor also labeling the remaining two finder patterns based on the relative distance between the remaining two finder patterns that would result if one of the remaining two finder patterns were rotated about the top left finder pattern less than 180 degrees.

In accordance with still yet another aspect, there is provided a computer readable medium embodying a computer program for extracting a bitstream from a machine-readable symbol in a digital image, the symbol comprising three finder patterns adjacent respective corners of the symbol and generally defining the corners of a right-angled triangle, the computer program comprising:

computer program code for identifying the finder patterns in the symbol;

computer program code for orienting the symbol using the finder patterns, the orienting comprising determining which of the three finder patterns is positioned at the corner of the triangle opposite its hypotenuse ("top left finder pattern"), and labeling the remaining two finder patterns based on the relative distance between the remaining two finder patterns that would result if one of the remaining two finder patterns were rotated about the top left finder pattern less than 180 degrees;

computer program code for on the basis of the orienting, delineating the symbol;

computer program code for mapping a decoding grid to the delineated symbol; and computer program code for extracting bit values from the mapped symbol.

In accordance with still yet another aspect, there is provided a computer readable medium embodying a computer program for determining orientation of a machine-readable symbol in an image, the symbol comprising three finder patterns adjacent respective corners of the symbol and generally defining the corners of a right-angled triangle, the computer program comprising:

computer program code for identifying the finder pattern that is positioned at the corner of the triangle opposite its hypotenuse ("top left finder pattern"); and computer program code for labeling the remaining two finder patterns based on the relative distance between the remaining two finder patterns that would result if one of the remaining two finder patterns were rotated about the top left finder pattern less than 180 degrees.

The method and apparatus described herein provide a simple and computationally straight-forward way to orient a two-dimensional machine-readable symbol, and also take skew or pitch of the symbol into account when estimating the symbol corners to provide an accurate mapping of a Reference Grid to the input symbol even when the input image is not ideal.

BRIEF DESCRIPTION OF THE DRAWINGS

Embodiments will now be described more fully with reference to the accompanying drawings, in which:

FIG. 30 shows the estimated corners and a more accurate fourth corner of the QR-Code symbol obtained using a fourth corner estimation algorithm;

FIG. 31 shows the QR-Code symbol transformed to a Reference Grid image space;

FIG. 32 shows the Reference Grid in Reference Grid image space;

FIG. 33 shows the Reference Grid transformed to input QR-Code symbol image space;

FIG. 34 shows the sequence of bits of the QR-Code symbol read from the transformed grid points;

FIG. 35 shows the unmasking bits;

FIG. 36 shows the sequence of bits of FIG. 34 having been unmasked using the unmasking bits of FIG. 35;

FIG. 37 shows the partial codeword placement grid for Version 5 Model 2 QR-Code;

FIG. 38 shows an output sequence of bits from the QR-Code symbol;

FIG. 39 shows the decoding results from the output sequence of bits of FIG. 38; and FIG. 40 shows an example log table used for error detection and correction.

DETAILED DESCRIPTION OF THE EMBODIMENTS

In the following description, a method, apparatus and computer readable medium embodying a computer program for locating and decoding a two-dimensional, machine-readable symbol in a digital image are provided. During the method, finder patters of the two-dimensional, machine-readable symbol are identified, and the symbol is oriented. On the basis of the estimation of a version of the symbol, a Reference Grid is mapped to the symbol and a bitstream is extracted and decoded from the mapped grid.

The two-dimensional symbol locating and decoding method and apparatus may be embodied in a software application including computer executable instructions executed by a processing unit such as a personal computer or other computing system environment. The software application may comprise program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

For ease of illustration, the symbol locating and decoding method and apparatus will be described with reference to a QR-Code symbol. Those of skill in the art will however understand that the principles described herein are applicable to locating and decoding other two-dimensional machine-readable symbologies.

Figure 1:
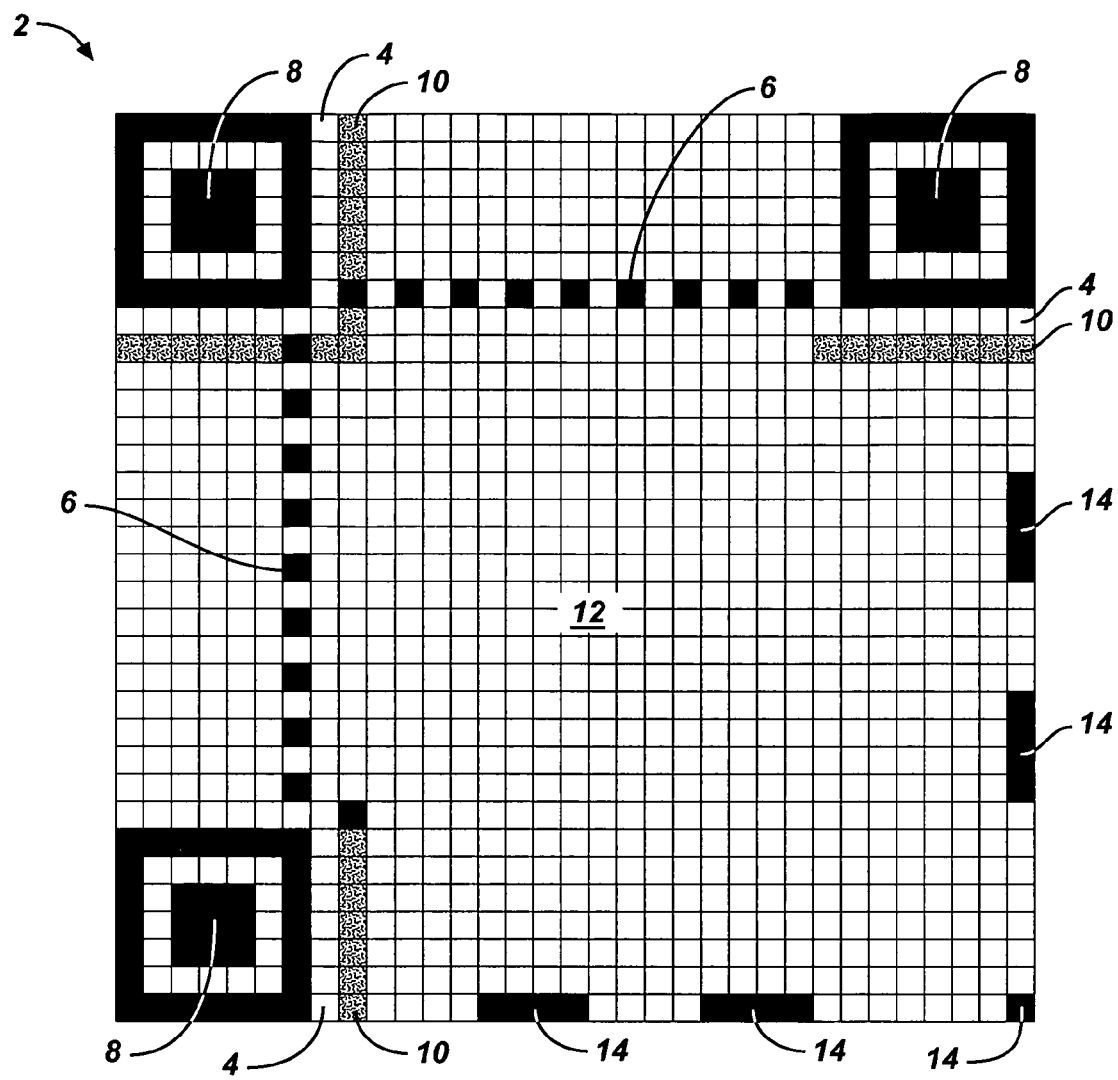
FIG. 1 is a diagram showing the structure of a Model 1 QR-Code symbol.
Figure 2:
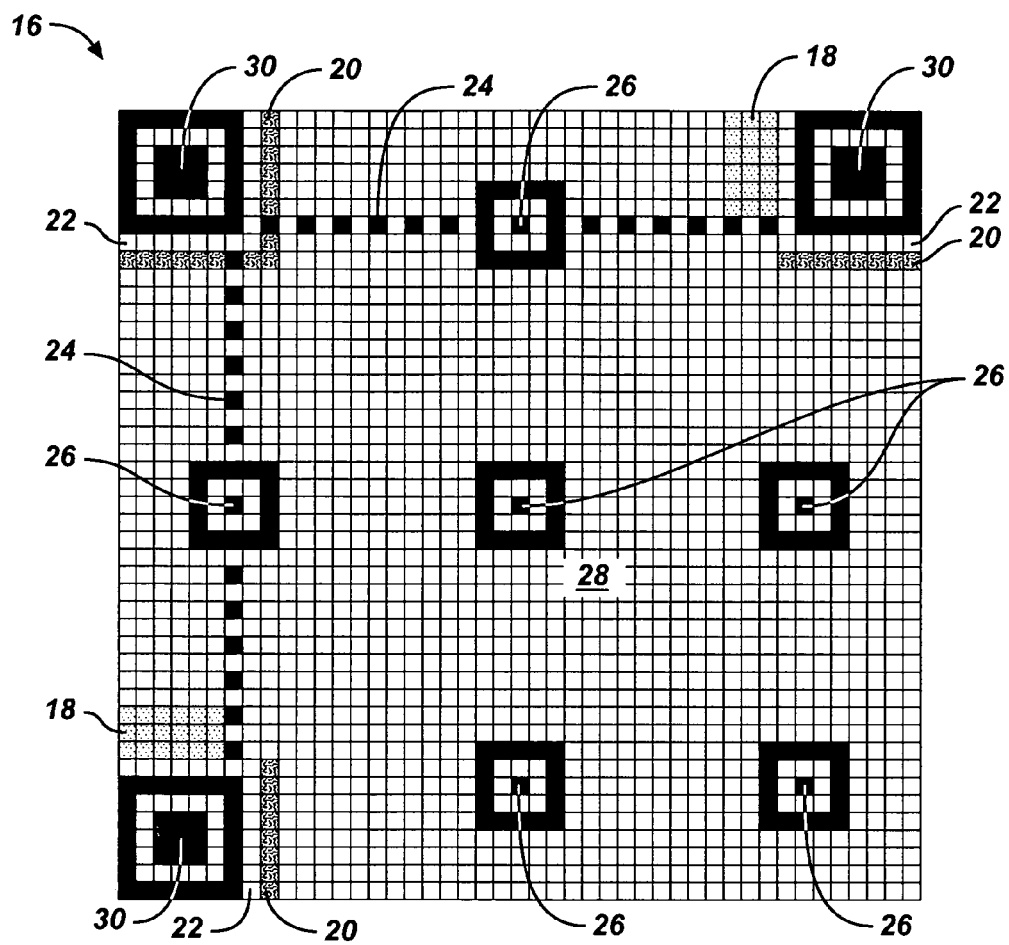
FIG. 2 is a diagram showing the structure of a Model 2 QR-Code symbol.

FIG. 1 shows the structure of a Model 1 QR-Code symbol 2, and FIG. 2 shows the structure of a Model 2 QR-Code symbol 16. Each QR-Code symbol 2, 16 is constructed of nominally square modules arranged as a regular square array. The symbol 2, 16 consists of an encoding region 12, 28 and function patterns. The function patterns comprise the finder patterns 8, 30 at three of the corners of the symbol, separators 4, 22 separating each finder pattern from the rest of the symbol, and timing patterns 6, 24. Only Model 1 QR-Code symbols 2 include extension patterns 14, and only Model 2 QR-Code symbols 16 include alignment patterns 26. The finder patterns define the corners of a right-angled triangle. The finder pattern opposite the hypotenuse of the triangle is typically positioned adjacent the top left corner of the symbol. As will however be appreciated, depending on the orientation of the symbol, this finder pattern may appear adjacent a different corner of the symbol. For ease of reference, the finder pattern opposite the hypotenuse of the triangle will be referred to as the "top left finder" pattern even though it may be positioned adjacent a different corner of the symbol.

Figure 3:
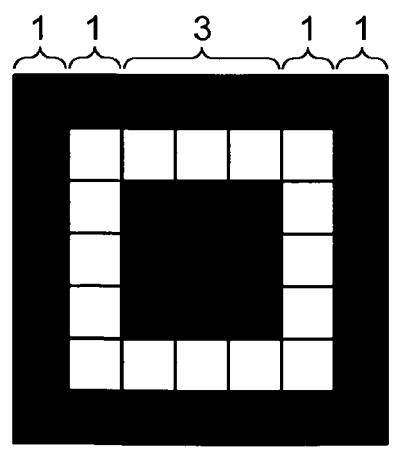
FIG. 3 is a diagram detailing the structure of a QR-Code symbol finder pattern.

FIG. 3 better illustrates the structure of a QR-Code symbol finder pattern. As can be seen, the finder pattern consists of a 3×3 block of black modules, surrounded by a square ring of white modules that is one (1) module thick. The square ring of white modules is, in turn, surrounded by a square ring of black modules that is itself one (1) module thick. Further details regarding QR-Code symbols and decoding may be found in the AIM Global (Association for Automatic Identification and Mobility) International Symbology Specification for QR-Code (ISS QR-Code), the content of which is incorporated herein by reference.

Figure 4:
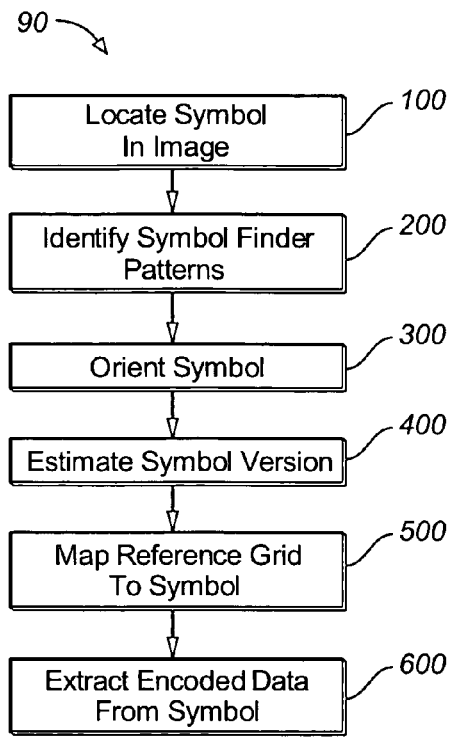
FIG. 4 is a flowchart showing the general steps performed during locating and decoding of a QR-Code symbol in a digital image.

Turning now to FIG. 4, a flowchart is shown presenting the general steps performed in order to locate and decode a two-dimensional machine-readable symbol such as a QR-Code symbol in a digital image. These steps are generally referred to using reference character 90. During the method, the digital image is examined to determine if a symbol exists therein (step 100). When a symbol is located in the digital image, the finder patterns of the symbol are identified in the located symbol (step 200). The symbol is then oriented using the finder patterns (step 300) and the version of the symbol is estimated (step 400). In accordance with the estimated symbol version, a Reference Grid is mapped to the symbol (step 500), whereupon the data encoded in the symbol is extracted from points on the mapped Reference Grid (step 600).

Figure 5:
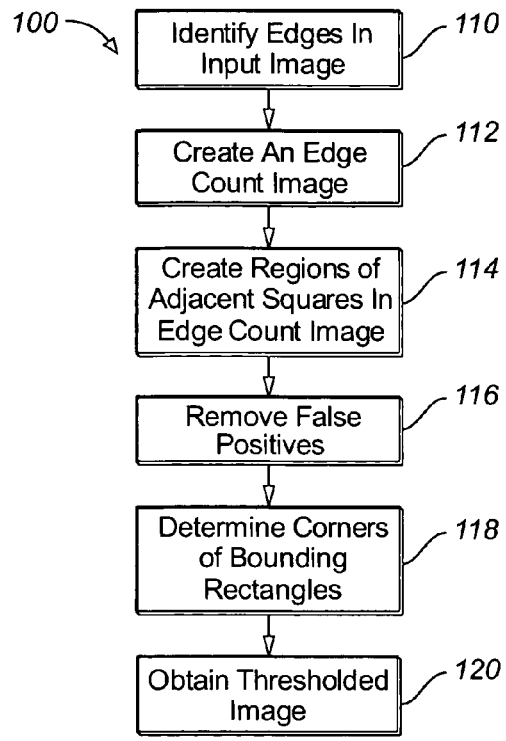
FIG. 5 is a flowchart showing the steps for locating a QR-Code symbol in the digital image.

FIG. 5 is a flowchart better illustrating the steps performed during examining of the digital image to locate the symbol (step 100). In order to locate possible symbol containing regions in the input digital image, edges in the digital image are first identified (step 110). An edge in the digital image is defined as a pair of pixels with one pixel in between, that differ by more than thirty-two (32) in brightness (scale 0-255). During edge identification, the digital image is scanned first horizontally and then vertically to identify edges. During this process some assumptions are made, namely that:

1. The digital image has sufficient contrast to differentiate white and black regions by at least a brightness amount of eighty (80). Though discernable images can be obtained with a brightness difference lower than eighty (80), noise may be difficult in such a case to deal with;

2. Blurred gray areas between black and white regions is at most four (4) pixels; and 3. No significant element is one (1) pixel wide to allow scanning every other pixel.

According to the above, most symbol edges will be identified as such because the separation of one pixel causes a difference of at least forty (40) at any symbol edge.

An edge-count image is then created (step 112) by scanning the digital image to locate edges as defined above, and representing the edges as pixel values in a new image. For example, in order to create the edge-count image, a pixel of value seven (7) represents seven (7) edges in a corresponding 8×8 region of the digital image. The edge count image is one-eighth the size of the input digital image, facilitating very fast subsequent processing.

The edge count image typically comprises a plurality of squares. Adjacent "edgy" squares (i.e. with higher pixel values) in the edge-count image are labeled as associated with a common region (step 114). A black-white threshold value is set to five (5) in order to identify most edges other than one-time transition from black to white (such as from white paper to black background in the image of FIG. 11, which has value four (4)). In this case, thresholding is integrated with labeling.

In exceptionally large images, the edges may not be concentrated enough to identify correct symbol containing regions. In such a case, a higher reducing scale (sixteen (16) rather than eight (8)) may be contemplated.

During labeling, the image is scanned once and connected regions are listed in an association table that uses a tree structure in which, for instance, two regions may be associated by having a common third region as their root.

At this point, all regions under the size of one hundred (100) are assumed too small to be a two-dimensional machine readable symbol and are filtered out as false positives (step 116).

Next, the corners of the smallest rectangle bounding the regions of associated edge squares are determined (step 118). Although the associated edge squares may be slanted at any arbitrary angle, only the rectangles slanted by an angle multiple of forty-five (45) degrees are considered, in order to reduce computation. The edge count image is scanned once and the extreme points (for example, leftmost point having smallest x value, or for slanted rectangles, topleft-most point having smallest x+y value and so on) are captured. As will be understood, a region may be enclosed either by a non-slanted rectangle with left, right, top and bottom-most boundary points, or by a slanted rectangle with topleft, topright, bottomleft, bottomright-most boundary points. As stated above, the bounding rectangle having the smallest enclosed area is chosen. At this stage, the boundary points are re-scaled back to the original size of the input digital image.

Figure 11:
FIG. 11 is a digital image of a scene that includes a QR-Code symbol.
Figure 12:
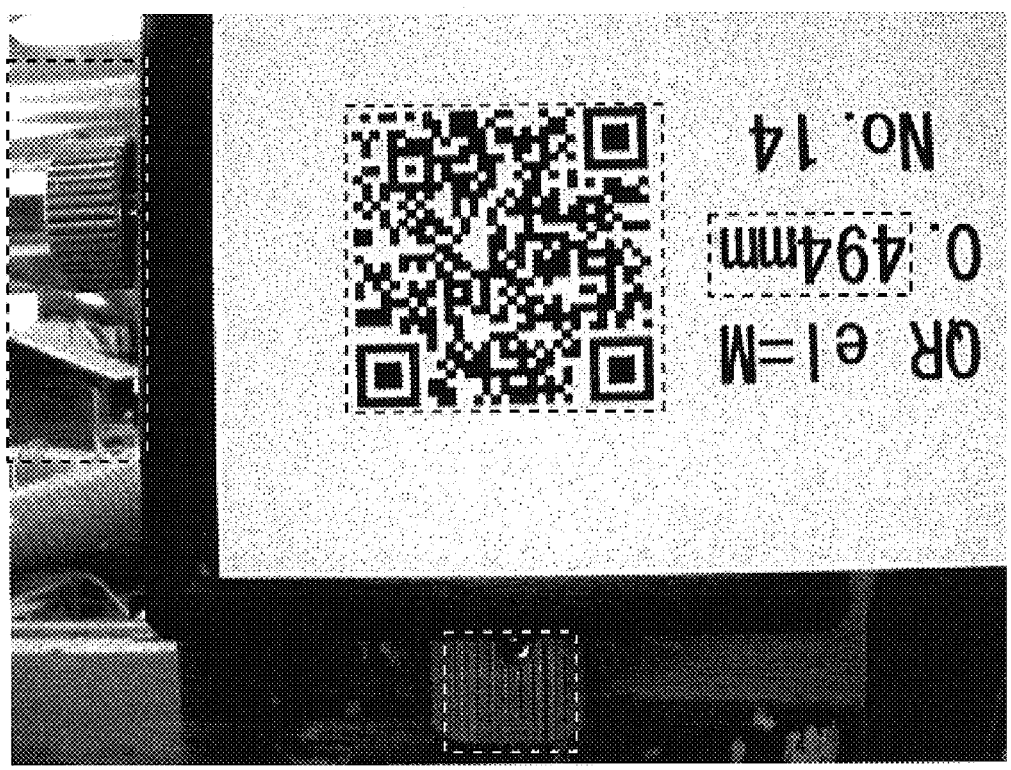
FIG. 12 is a digital image showing the identification of regions of the digital image of FIG. 11 that are QR-Code symbol candidates.

FIG. 12 shows the re-scaled bounding rectangles superimposed onto the input digital image of FIG. 11. As can be seen, a number of regions have been identified as containing candidate QR-Code symbols. While there are two (2) candidate symbols identified, only one of them is indeed a QR-Code symbol. Although each identified region is processed to determine if it contains a QR-Code symbol, the region containing the highest edge count is processed first.

With the candidate symbol containing regions determined, a threshold image corresponding to the input digital image is obtained (step 120) by first calculating a threshold value and then converting all pixels to either black or white based on their value relative to the threshold value. The threshold is calculated by forming a sum of the pixel brightness values (PixelSum) for row and column step sizes (RowStepSize, ColumnStepSize) of ten (10) pixels in the input digital image and dividing the sum by the number of pixel values that have been summed (NumPixel). Pseudocode for calculating the threshold value for the input digital image is shown in Appendix A.

The threshold value for the input image of FIG. 11 is one hundred and sixteen (116). It will be understood that the dimensions of the threshold image are equal to that of the input digital image.

Figure 6:
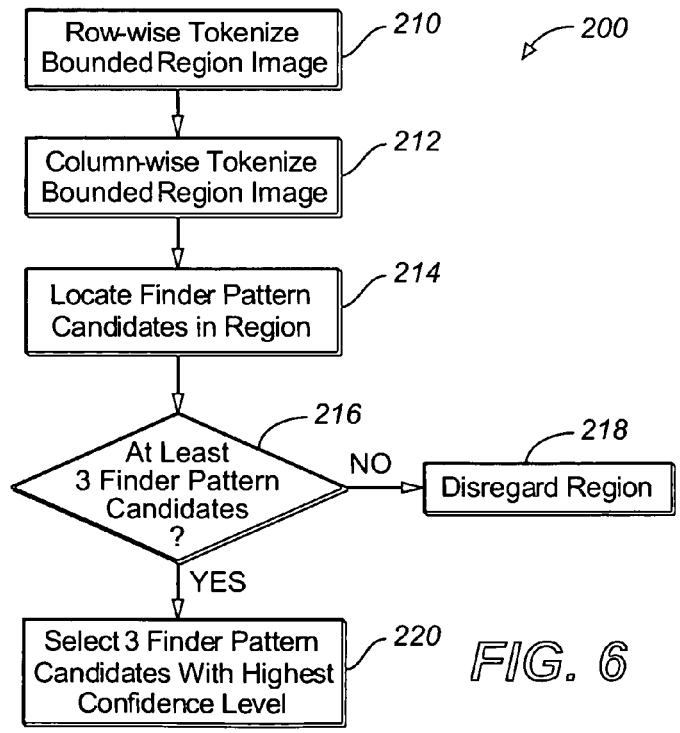
FIG. 6 is a flowchart showing the steps for identifying finder patterns in a QR-Code symbol.

FIG. 6 better illustrates the steps performed in order to identify symbol finder patterns (step 200) in the regions. First, each region in the thresholded image is row-wise tokenized (step 210) and column-wise tokenized (step 212). Tokenizing converts runs of same ones of black and white pixels into respective black and white tokens, in order to facilitate processing runs of same-color pixels as one unit.

In order to locate the finder patterns (if any) in a region, all QR-Code finder pattern candidates in the region are identified (step 214) and accorded a confidence level. If there are more than three (3) finder pattern candidates (step 216), then the three finder pattern candidates with the highest accorded confidence level are chosen as the candidate finder patterns for the region (step 220). If there are less than three (3) finder pattern candidates (step 216), then the region is considered not to contain a QR-Code symbol and is disregarded (step 218). The identification of finder pattern candidates and the according of confidence values, as shown in the pseudocode of Appendix B, is performed by scanning each row of the thresholded image from the first to the last (Height), forming row-wise tokens (RowWiseTokenize), and adding the tokens to an array (TokenArray). Once at least five (5) tokens have been formed, if a row-wise pattern of black tokens provides the 1:1:3:1:1 pattern using token widths (TokenArray[nTokIdx].width, TokenArray[nTokIdx+1].width etc.), then the center of the row-wise pattern is identified as a column (col). It is then determined whether the 1:1:3:1:1 token pattern, centered on the row, can be located along the column (col). If the pattern is identified in the column (col), then the middle of the row-wise pattern is deemed to be the X-coordinate (rc) of a candidate finder pattern center and the middle of the column-wise pattern is deemed to be the Y-coordinate (cc) of the candidate finder pattern center. The candidate finder pattern center is then added to a candidate list (CandidateList). If the candidate finder pattern center (rc,cc) is already in the candidate list (CandidateList), then its confidence level is incremented.

Figure 7:
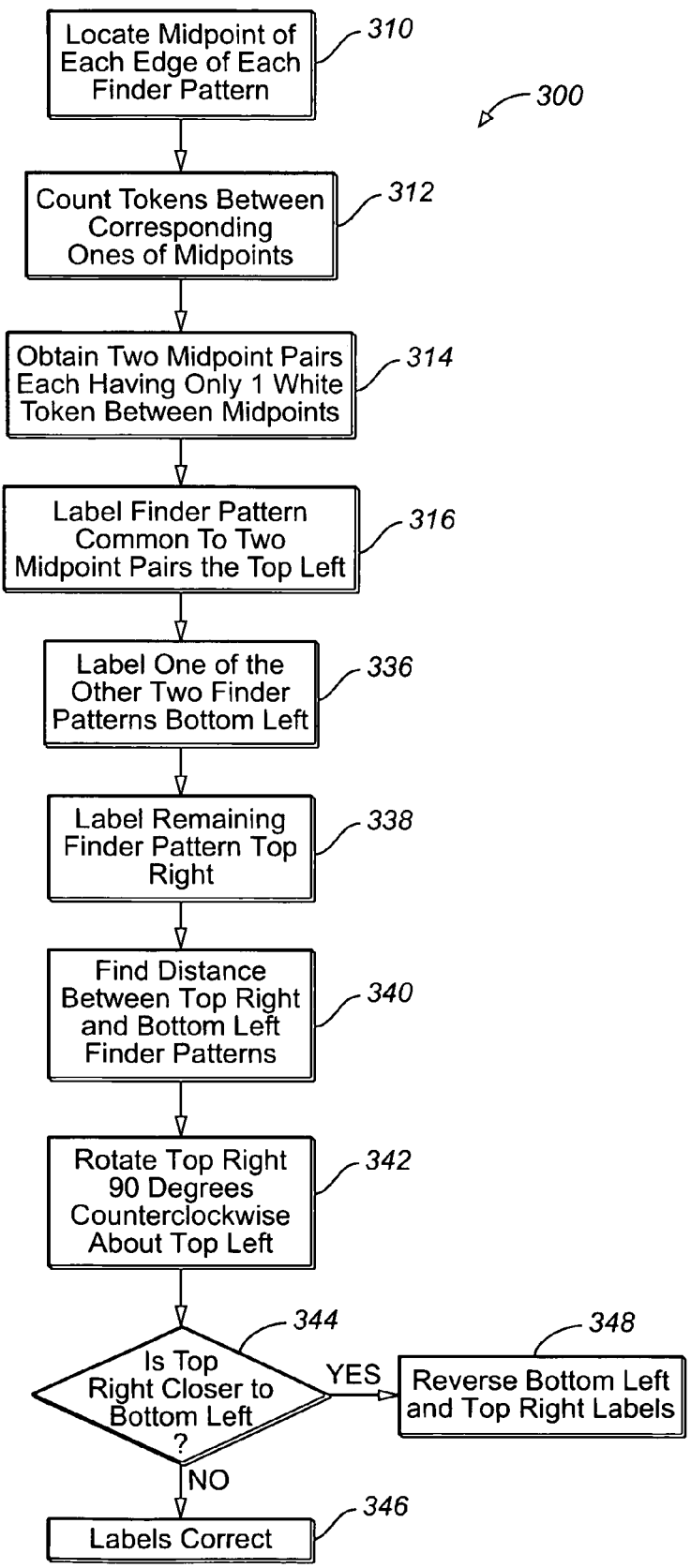
FIG. 7 is a flowchart showing the steps for orienting a QR-Code symbol.

FIG. 7 better illustrates the steps for orienting a QR-Code symbol once its finder patterns have been identified (step 300). During this process, some assumptions are made, namely that:

1. The finder pattern locations have been correctly identified;

2. The three finder patterns of the QR-Code symbol have been located;

3. The quiet zone of the QR-Code symbol is free of all other markings; and

4. The entire QR-Code symbol is inside the input digital image.

Figure 13:
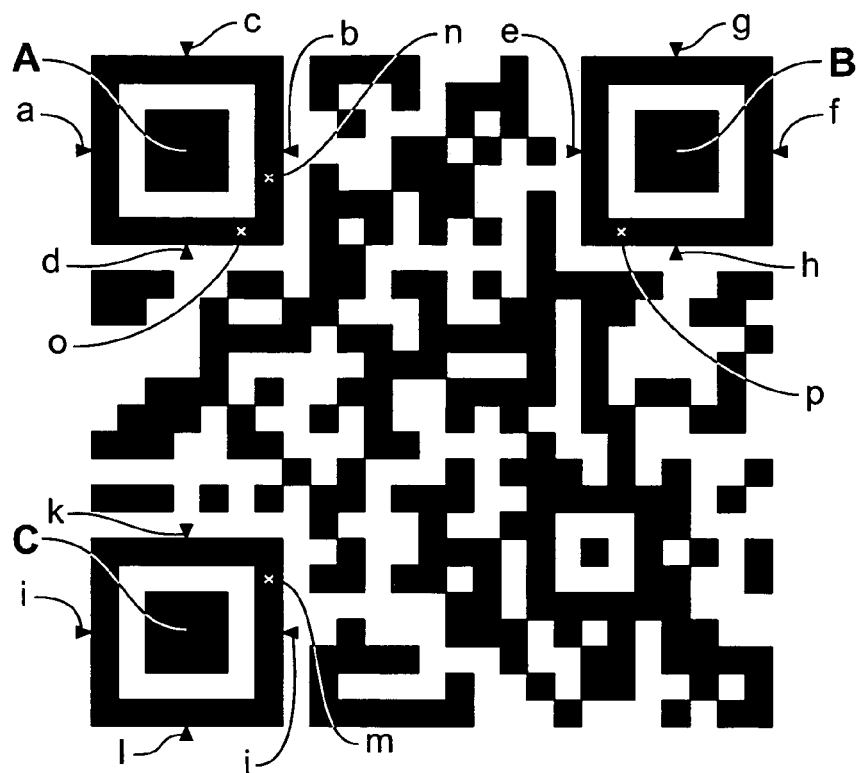
FIG. 13 is a diagram showing selected QR-Code symbol finder pattern points for determining symbol orientation.

For the input digital image of FIG. 11, orientation establishes the finder pattern at the bottom right of the region containing the QR-Code symbol as finder pattern A, the finder pattern at the bottom left of the region as finder pattern B and the finder pattern at the top right of the region as finder pattern C, as shown in FIG. 13.

Orientation begins with locating the midpoint of each edge of each of the three finder patterns (step 310). These midpoints are labeled as points a to l in FIG. 13. Tokens are counted along line segments extending between corresponding midpoints of each pair of finder patterns (step 312). The corresponding midpoints in this case are {a to e}, {a to i}, {e to i}, {c to g}, {c to k}, {g to k}, {b to f}, {b to j}, {j to f}, {d to j}, {d to l} and {j to l}. The midpoint pairs that yield only one white token (step 314) therebetween are obtained. These midpoint pairs are {c to g} and {a to i} in FIG. 13.

The finder pattern that is common to the midpoint pairs that yield only one white token, in this case finder pattern A, is declared as the top left finder pattern (step 316). At this point, the remaining two finder patterns, which are in generally opposite corners of the QR-Code symbol are temporarily labeled as bottom left and top right finder patterns, respectively (steps 336 and 338).

The distance between the finder patterns labeled as bottom left and top right is then found (step 340). In order to determine if the labels assigned to these finder patterns are correct, the finder pattern temporarily labeled as the top right is rotated counterclockwise about the top left finder pattern by 90 degrees (step 342). If, after rotation, the finder pattern temporarily labeled as the top right is closer in distance to the bottom left finder pattern prior to rotation at step 340 (step 344), then the labels assigned to these finder patterns are reversed (step 348). If, after rotation, the finder pattern temporarily labeled as the top right is further in distance to the bottom left finder pattern prior to rotation at step 340 (step 344), then the labels assigned to these finder patterns are considered correct (step 346).

While a counterclockwise rotation of 90 degrees has been specified, it will be understood that rotation of the labeled top right finder pattern about the top left finder pattern anywhere between 0 and 180 degrees (not inclusive) counterclockwise will allow the labeling of the top right and bottom left finder patterns to be confirmed.

Once the finder patterns have been properly labeled and the orientation of the QR-Code symbol has been determined, the symbol version is estimated (step 400) in order to determine the configuration of the Reference Grid to be used to decode the QR-code symbol. To estimate the QR-code symbol version, the number of cells in the row and in the column of the QR-Code symbol is determined. In particular, with reference once again to FIG. 13, the number of tokens between points {n and m} and points {o and p} is determined. For the QR-Code symbol shown in FIG. 13, the determined number of tokens between points {o and p} is the same as the number of tokens between points {m and n}, the count being thirteen (13). Equation (1) below is employed to estimate the version of the QR-Code symbol:

$$VersionNumber = \frac{NumberTokensBetween\{o, p\} - NumofExtraTokens - 5}{4} + 1 \quad (1)$$

where
5=Number of Modules in Timing Pattern for Version 1.
NumofExtraTokens=4=2 Tokens extra tokens from beginning+2 tokens from end of the timing pattern.

On the basis of Equation (1), the version of the QR-Code symbol in FIG. 13 is two (2). Equation (2) below is employed to estimate the number of modules in a row of the symbol:

$$NumberOfModules=2\times(FinderMods+SeperatorMods)+TimingPatternMods \quad (2)$$

where
TimingPatternMods=VersionNumber*4+5
FinderMods=7
SeperatorMods=1

Rearranging Equation (2), the version number can be calculated according to Equation (3) below:

$$VersionNumber = \frac{NumberOfModules - 16 - 5}{4} + 1 \quad (3)$$

For the QR-Code symbol in the input digital image shown in FIG. 11, the number of modules in a row is thirty-three (33) because Timing–PatternMods=17, and the version number of that symbol is three (3).

Figure 9:
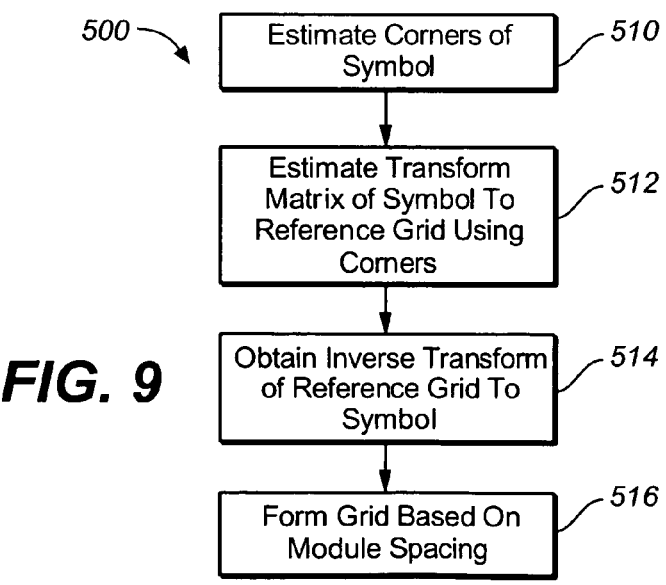
FIG. 9 is a flowchart showing the steps for mapping a QR-Code symbol to a reference decoding grid.
Figure 15:
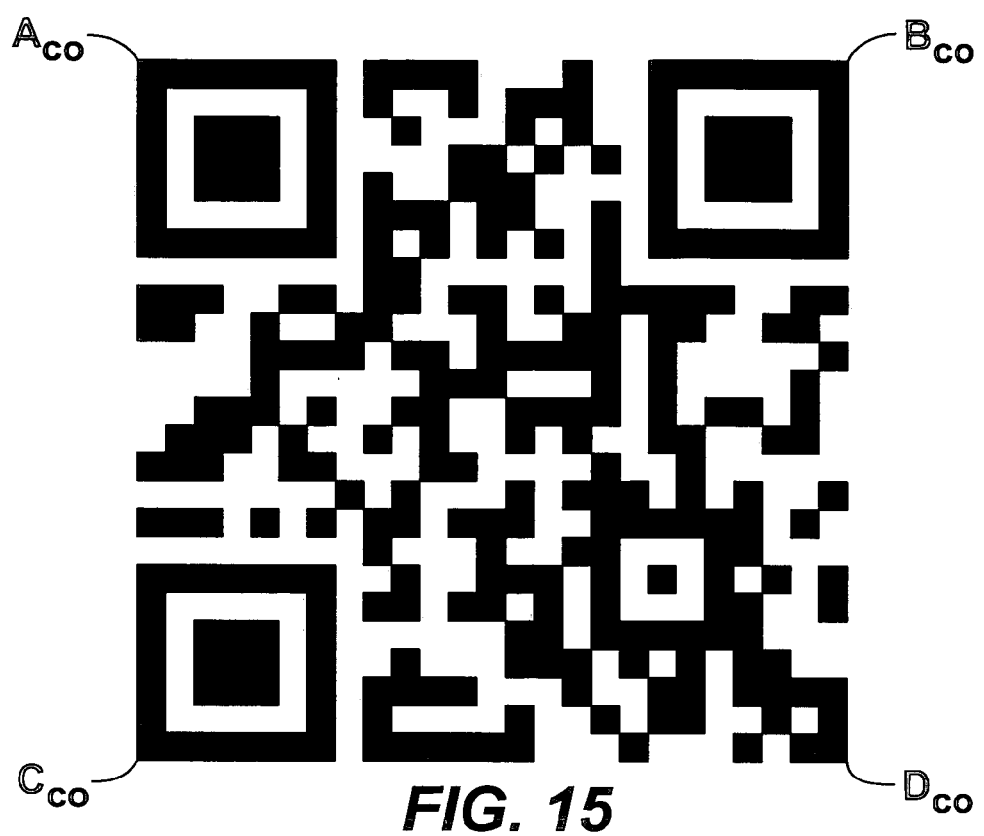
FIG. 15 is a diagram showing the corners of a QR-Code symbol.

FIG. 9 better illustrates the steps for mapping a Reference Grid to the QR-Code symbol in the input digital image. In order to obtain a sufficient number of coordinates to create a transformation between the QR-Code symbol and the Reference Grid, the four corners of the QR-Code symbol must be located. In order to estimate the symbol corners $A_{co}$, $B_{co}$ and $C_{co}$ shown in FIG. 15, the top left, top right and bottom left finder patterns are employed.

Figure 16:
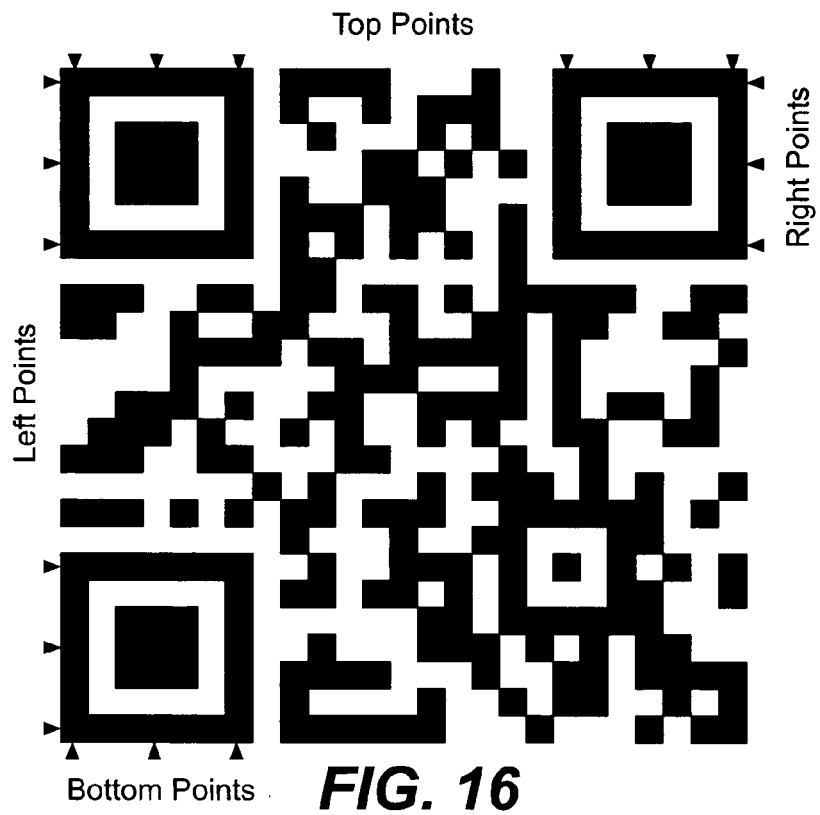
FIG. 16 is a diagram showing edge points of the QR-Code symbol finder patterns selected for determining three of the corners of the symbol.
Figure 17:
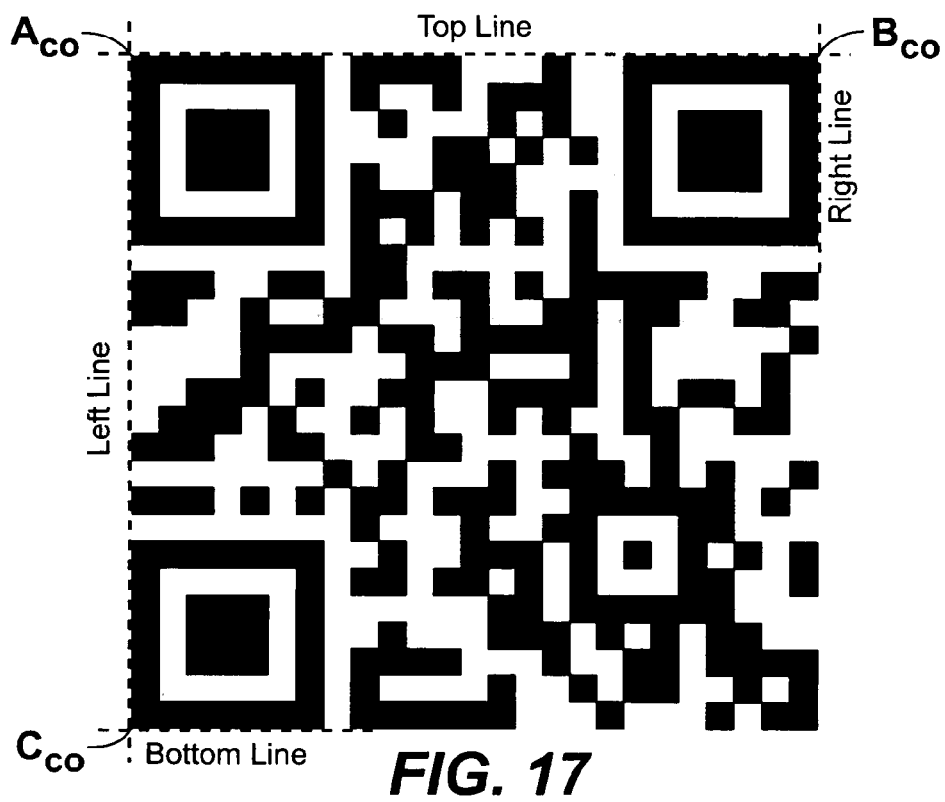
FIG. 17 is a diagram showing lines through the edge points in FIG. 16, the intersections of which occur at the top left, bottom left and top right corners of the QR-Code symbol.
Figure 18:
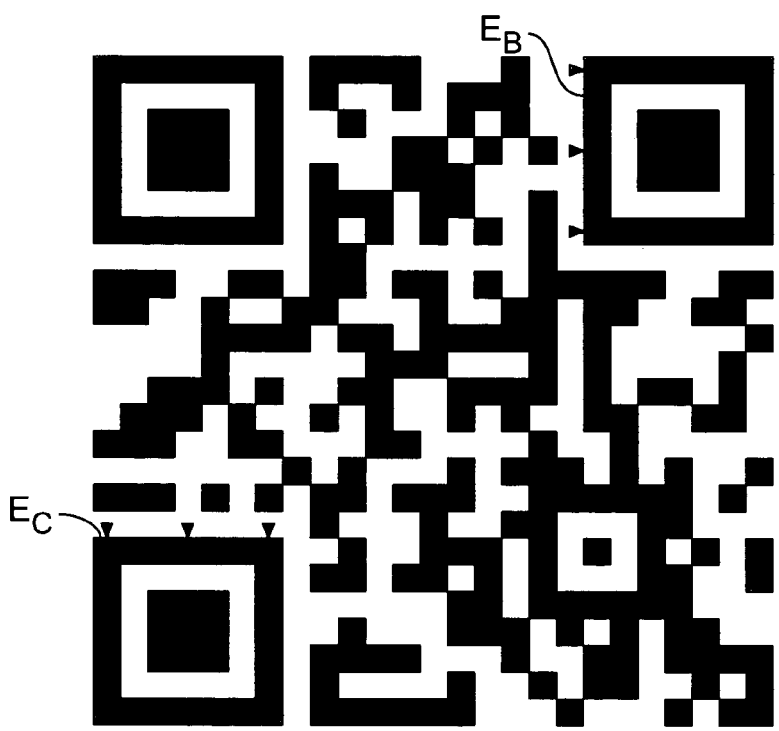
FIG. 18 is a diagram showing edge points of the QR-Code symbol finder patterns selected for determining the fourth corner of the QR-Code symbol.
Figure 19:
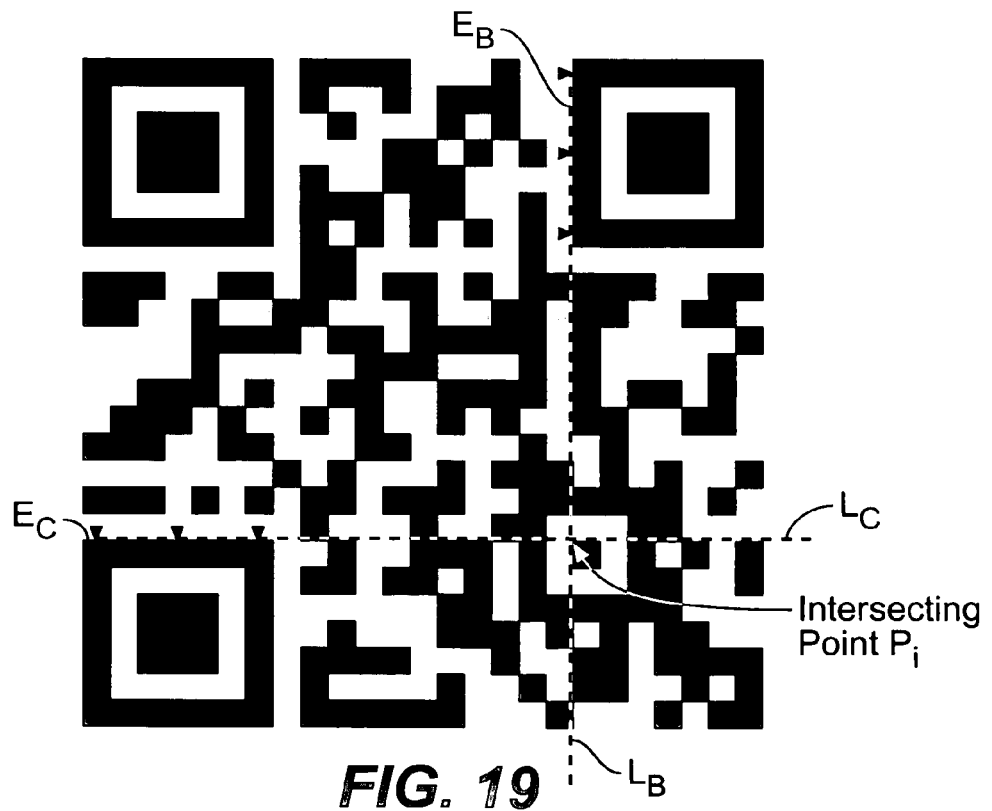
FIG. 19 is a diagram showing the intersection of lines through the edge points of FIG. 18.
Figure 20:
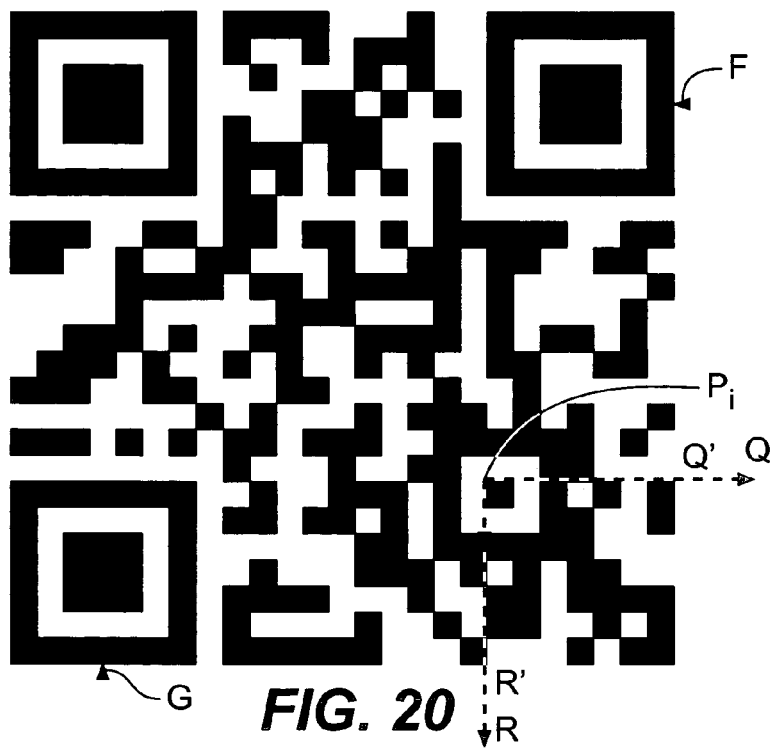
FIG. 20 is a diagram showing a selected edge point on each of the top right and bottom left finder patterns for determining the fourth corner of the QR-Code symbol.
Figure 21:
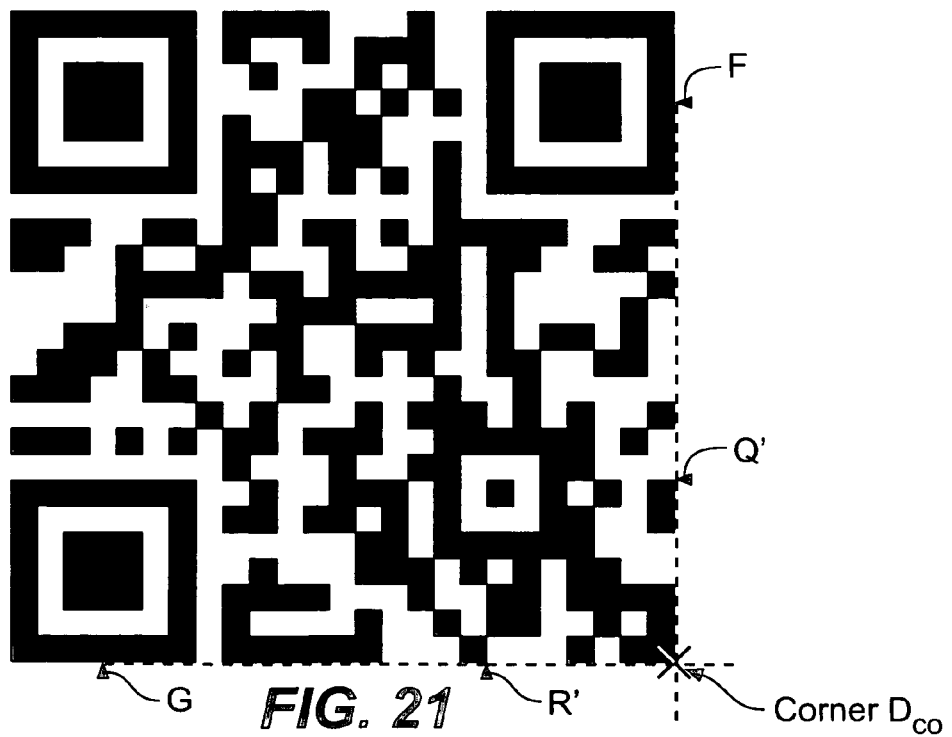
FIG. 21 is a diagram showing the intersection of two lines formed using the points in FIG. 20.

In general, during symbol corner estimation, points on the outside edges of the three located finder patterns A, B, C as shown in FIG. 16 are located and used to form a left line, a right line, a top line and a bottom line using the least squares fitting method. As shown in FIG. 17, each of the lines is used to identify symbol corners $A_{co}$, $B_{co}$ and $C_{co}$. In particular, symbol corner $A_{co}$ is at the intersection of the top and left lines, symbol corner $B_{co}$ is at the intersection of the top and right lines, and symbol corner $C_{co}$ is at the intersection of the bottom and left lines. The fourth symbol corner $D_{co}$ (i.e. the one without a finder pattern) is estimated in a different manner, as will be described.

The least squares fitting method fits a curve through points on the basis that the best-fit curve of a given type is the curve that has the minimal sum of deviations squared (least square error) from a given set of data. According to the least squares fitting method, the best fitting curve has the property that:

$$\Pi = d_1^2 + d_2^2 + \ldots + d_n^2 = \sum_{i=1}^{n} d_i^2 = \sum_{i=1}^{n} [y_i - f(x_i)]^2 = \text{a minimum} \quad (4)$$

The least-squares line is a straight line:

$$y=a+bx \quad (5)$$

that approximates a given set of data, $(x_1,y_1)$, $(x_2,y_2)$, ..., $(x_n,y_n)$, where n≥2. The best fitting curve f(x) has the least square error, i.e., $$\Pi = \sum_{i=1}^{n} [y_i - (a + bx_i)]^2 = \min \quad (6)$$

It will be noted that a and b are unknown coefficients while all $x_i$ and $y_i$ are known coordinates. To obtain the least square error, the unknown coefficients a and b must yield zero first derivatives, as expressed by the following equations:

$$\begin{cases} \dfrac{\partial \Pi}{\partial a} = 2\sum_{i=1}^{n} [y_i - (a + bx_i)]^2 = 0 & (7) \\ \dfrac{\partial \Pi}{\partial b} = 2\sum_{i=1}^{n} x_i[y_i - (a + bx_i)]^2 = 0 & (8) \end{cases}$$

Expanding the above yields:

$$\begin{cases} \sum_{i=1}^{n} y_i = a \sum_{i=1}^{n} 1 + b \sum_{i=1}^{n} x_i & (9) \\ \sum_{i=1}^{n} x_i y_i = a \sum_{i=1}^{n} x_i + b \sum_{i=1}^{n} x_i^2 & (10) \end{cases}$$

The unknown coefficients a and b can therefore be obtained by solving as follows:

$$\begin{cases} a = \dfrac{\sum_{i=1}^{n} y_i \sum_{i=1}^{n} x_i^2 - \sum_{i=1}^{n} x_i \sum_{i=1}^{n} x_i y_i}{n \sum_{i=1}^{n} x_i^2 - \left(\sum_{i=1}^{n} x_i\right)^2} & (11) \\ b = \dfrac{n \sum_{i=1}^{n} x_i y_i - \sum_{i=1}^{n} x_i \sum_{i=1}^{n} y_i}{n \sum_{i=1}^{n} x_i^2 - \left(\sum_{i=1}^{n} x_i\right)^2} & (12) \end{cases}$$

The above-described method provides a sufficient estimation of symbol corners $A_{co}$, $B_{co}$, and $C_{co}$. However, it will be understood that due to skew or pitch of a QR-Code symbol in an input digital image, the intersection of the bottom and right lines may not provide a sufficiently accurate estimation of symbol corner $D_{co}$. Rather, the intersection of those lines may yield a point that is significantly inside or outside the QR-Code symbol. As a result, a corner estimating technique that takes into account the possibility of symbol skew and pitch is used to estimate symbol corner $D_{co}$.

The manner by which the fourth symbol corner $D_{co}$ is estimated will now be described with reference to FIGS. 18 to 21. Point $P_i$ is firstly defined as the intersection point of a line $L_B$ collinear with the inside edge $E_B$ of finder pattern B that faces finder pattern A and a line $L_C$ collinear with the inside edge $E_C$ of finder pattern C that faces finder pattern A (see FIGS. 18 and 19). A set of closely spaced test points on each of the lines $L_C$ and $L_B$ is defined between point $P_i$ and respective arbitrary points Q, R outside the symbol (see FIG. 20).

The midpoint F along the outside edge of finder pattern B that is opposite edge $E_B$ and the midpoint G along the outside edge of finder pattern C that is opposite edge $E_C$ are defined. Line segments extending from midpoint F to each of the test points along line $L_C$ are defined sequentially beginning with the test point nearest intersection point $P_i$. As each line segment is defined it is examined to determine if the line segment passes through only white pixels. When a line segment passing through only white pixels is determined, the process is stopped and the test point is designated as the point Q' on line $L_C$ that coincides with the outside edge of the symbol. Similarly, line segments extending from midpoint G to each of the test points along line $L_B$ are defined sequentially beginning with the test point nearest intersection point $P_i$. As each line segment is defined it is examined to determine if the line segment passes through only white pixels. When a line segment passing through only white pixels is determined, the process is stopped and the test point is designated as the point R' on the line $L_B$ that coincides with the outside edge of the symbol. The equations for the line segments (F→Q') and (G→R') are then determined and the point of intersection calculated thereby to yield the location of the fourth symbol corner $D_{co}$ (see FIG. 21).

The above method for locating the fourth symbol corner $D_{co}$ yields a more accurate result than would be achieved if the intersection of the bottom line and right line of FIG. 17 was simply used to define the fourth symbol corner $D_{co}$, because it makes use of points on the symbol edges that are close to the actual symbol corner.

Having obtained the corners of the QR-Code symbol, a transformation from the symbol plane to a Reference Grid plane is determined (step 512). In general, it will be understood that a projective transformation from one projective plane to another is represented as:

$$\begin{pmatrix} x_1 \\ x_2 \\ x_3 \end{pmatrix} = \begin{pmatrix} t_{11} & t_{12} & t_{13} \\ t_{21} & t_{22} & t_{23} \\ t_{31} & t_{32} & t_{33} \end{pmatrix} \begin{pmatrix} X_1 \\ X_2 \\ X_3 \end{pmatrix} \quad (13)$$

where x=Destination Transformed objects and X=the source objects.

If such a transformation is represented in Cartesian coordinates the nonlinear nature of the projective transformation in Euclidean is as follows:

$$x = \frac{x_1}{x_3} = \frac{t_{11}X + t_{12}Y + t_{13}}{t_{31}X + t_{32}Y + t_{33}} \quad (14)$$

$$y = \frac{x_2}{x_3} = \frac{t_{21}X + t_{22}Y + t_{23}}{t_{31}X + t_{32}Y + t_{33}} \quad (15)$$

As can be seen, a projective Transform Matrix, T, requires eight (8) independent parameters to define a unique mapping. Since each point in a plane provides two Cartesian coordinate equations, it is necessary to find four points of correspondence between two projectively transformed planes to define the Transform Matrix uniquely. Because the overall scale of the Transform Matrix T is arbitrary, $t_{33}$ can be set=1. If four points of correspondence are represented by, $(\lambda_i x_i, \lambda_i y_i, \lambda_i)^t = T(X_i, Y_i, 1)^t$, the resulting linear system of equations is:

$$\begin{pmatrix} X_1 & Y_1 & 1 & 0 & 0 & 0 & -x_1X_1 & -x_1Y_1 \\ 0 & 0 & 0 & X_1 & Y_1 & 1 & -y_1X_1 & -y_1Y_1 \\ X_2 & Y_2 & 1 & 0 & 0 & 0 & -x_2X_2 & -x_2Y_2 \\ 0 & 0 & 0 & X_2 & Y_2 & 1 & -y_2X_2 & -y_2Y_2 \\ X_3 & Y_3 & 1 & 0 & 0 & 0 & -x_3X_3 & -x_3Y_3 \\ 0 & 0 & 0 & X_3 & Y_3 & 1 & -y_3X_3 & -y_3Y_3 \\ X_4 & Y_4 & 1 & 0 & 0 & 0 & -x_4X_4 & -x_4Y_4 \\ 0 & 0 & 0 & X_4 & Y_4 & 1 & -y_4X_4 & -y_4Y_4 \end{pmatrix} \begin{pmatrix} t_{11} \\ t_{12} \\ t_{13} \\ t_{21} \\ t_{22} \\ t_{23} \\ t_{31} \\ t_{32} \end{pmatrix} = \begin{pmatrix} x_1 \\ y_1 \\ x_2 \\ y_2 \\ x_3 \\ y_3 \\ x_4 \\ y_4 \end{pmatrix} \quad (16)$$

where $t_{11}$, $t_{12}$, $t_{13}$, $t_{21}$, $t_{22}$, $t_{23}$, $t_{31}$ and $t_{32}$ are from Matrix, $$T = \begin{pmatrix} t_{11} & t_{12} & t_{13} \\ t_{21} & t_{22} & t_{23} \\ t_{31} & t_{32} & 1 \end{pmatrix}$$

By solving this linear system of equations, the Transform Matrix T is obtained. In order to obtain the inverse Transform Matrix $T_{inverse}$, the following linear system of equations is solved:

$$\begin{pmatrix} x_1 & y_1 & 1 & 0 & 0 & 0 & -X_1x_1 & -X_1y_1 \\ 0 & 0 & 0 & x_1 & y_1 & 1 & -Y_1x_1 & -Y_1y_1 \\ x_2 & y_2 & 1 & 0 & 0 & 0 & -X_2x_2 & -X_2y_2 \\ 0 & 0 & 0 & x_2 & y_2 & 1 & -Y_2x_2 & -Y_2y_2 \\ x_3 & y_3 & 1 & 0 & 0 & 0 & -X_3x_3 & -X_3y_3 \\ 0 & 0 & 0 & x_3 & y_3 & 1 & -Y_3x_3 & -Y_3y_3 \\ x_4 & y_4 & 1 & 0 & 0 & 0 & -X_4x_4 & -X_4y_4 \\ 0 & 0 & 0 & x_4 & y_4 & 1 & -Y_4x_4 & -Y_4y_4 \end{pmatrix} \begin{pmatrix} t_{11} \\ t_{12} \\ t_{13} \\ t_{21} \\ t_{22} \\ t_{23} \\ t_{31} \\ t_{32} \end{pmatrix} = \begin{pmatrix} X_1 \\ Y_1 \\ X_2 \\ Y_2 \\ X_3 \\ Y_3 \\ X_4 \\ Y_4 \end{pmatrix} \quad (17)$$

where $t_{11}$, $t_{12}$, $t_{13}$, $t_{21}$, $t_{22}$, $t_{23}$, $t_{31}$ and $t_{32}$ are from Matrix, $$T_{inverse} = \begin{pmatrix} t_{11} & t_{12} & t_{13} \\ t_{21} & t_{22} & t_{23} \\ t_{31} & t_{32} & 1 \end{pmatrix}$$

In the case of QR-Code symbol decoding, the four located symbol corners $A_{co}$, $B_{co}$, $C_{co}$ and $D_{co}$ may be used as the four points in the input digital image plane. In order to find the Transform Matrix T, the linear system of equations shown below is solved:

$$\begin{pmatrix} X_A & Y_A & 1 & 0 & 0 & 0 & -x_aX_A & -x_aY_A \\ 0 & 0 & 0 & X_A & Y_A & 1 & -y_aX_A & -y_aY_A \\ X_B & Y_B & 1 & 0 & 0 & 0 & -x_bX_B & -x_bY_B \\ 0 & 0 & 0 & X_B & Y_B & 1 & -y_bX_B & -y_bY_B \\ X_C & Y_C & 1 & 0 & 0 & 0 & -x_cX_C & -x_cY_C \\ 0 & 0 & 0 & X_C & Y_C & 1 & -y_cX_C & -y_cY_C \\ X_D & Y_D & 1 & 0 & 0 & 0 & -x_dX_D & -x_dY_D \\ 0 & 0 & 0 & X_D & Y_D & 1 & -y_dX_D & -y_dY_D \end{pmatrix} \begin{pmatrix} t_{11} \\ t_{12} \\ t_{13} \\ t_{21} \\ t_{22} \\ t_{23} \\ t_{31} \\ t_{32} \end{pmatrix} = \begin{pmatrix} x_a \\ y_a \\ x_b \\ y_b \\ x_c \\ y_c \\ x_d \\ y_d \end{pmatrix} \quad (18)$$

where $t_{11}$, $t_{12}$, $t_{13}$, $t_{21}$, $t_{22}$, $t_{23}$, $t_{31}$ and $t_{32}$ are from Matrix, $$T = \begin{pmatrix} t_{11} & t_{12} & t_{13} \\ t_{21} & t_{22} & t_{23} \\ t_{31} & t_{32} & 1 \end{pmatrix}$$

and $(x_a, y_a)=(0, 0)$, $(x_b, y_b)=($NumberOfModules$\times 5, 0)$,
$(x_c, y_c)=($NumberOfModules$\times 5$, NumberOfModules$\times 5)$,
$(x_d, y_d)=(0,$ NumberOfModules$\times 5)$
5=Width of the Module in Reference Grid Note:
Corner A↦Corner a in Reference Grid
Corner B↦Corner b in Reference Grid
Corner C↦Corner c in Reference Grid
Corner D↦Corner d in Reference Grid The Transform Matrix T maps the input symbol onto a Reference Grid, and the inverse Transform Matrix $T_{inverse}$ maps the Reference Grid onto the input symbol. In order to obtain the inverse Transform Matrix $T_{Inverse}$ (step 514), the following linear system of equations is solved:

$$\begin{pmatrix} x_a & y_a & 1 & 0 & 0 & 0 & -X_Ax_a & -X_Ay_a \\ 0 & 0 & 0 & x_a & y_a & 1 & -Y_Ax_a & -Y_Ay_a \\ x_b & y_b & 1 & 0 & 0 & 0 & -X_Bx_b & -X_By_b \\ 0 & 0 & 0 & x_b & y_b & 1 & -Y_Bx_b & -Y_By_b \\ x_c & y_c & 1 & 0 & 0 & 0 & -X_Cx_c & -X_Cy_c \\ 0 & 0 & 0 & x_c & y_c & 1 & -Y_Cx_c & -Y_Cy_c \\ x_d & y_d & 1 & 0 & 0 & 0 & -X_Dx_d & -X_Dy_d \\ 0 & 0 & 0 & x_d & y_d & 1 & -Y_Dx_d & -Y_Dy_d \end{pmatrix} \begin{pmatrix} t_{11} \\ t_{12} \\ t_{13} \\ t_{21} \\ t_{22} \\ t_{23} \\ t_{31} \\ t_{32} \end{pmatrix} = \begin{pmatrix} X_A \\ Y_A \\ X_B \\ Y_B \\ X_C \\ Y_C \\ X_D \\ Y_D \end{pmatrix} \quad (19)$$

where $t_{11}$, $t_{12}$, $t_{13}$, $t_{21}$, $t_{22}$, $t_{23}$, $t_{31}$ and $t_{32}$ are from Inverse Matrix, $$T_{Inverse} = \begin{pmatrix} t_{11} & t_{12} & t_{13} \\ t_{21} & t_{22} & t_{23} \\ t_{31} & t_{32} & 1 \end{pmatrix}$$

and $(x_a, y_a)=(0, 0)$, $(x_b, y_b)=($NumberOfModules$\times 5, 0)$,
$(x_c, y_c)=($NumberOfModules$\times 5$, NumberOfModules$\times 5)$,
$(x_d, y_d)=(0,$ NumberOfModules$\times 5)$
5=Width of the Module in Reference Grid With the inverse Transform Matrix $T_{inverse}$ mapping the Reference Grid to the QR-Code symbol having been obtained, the grid for extracting bits from the QR-Code symbol is formed (step 518). That is, the points on the Reference Grid are determined and mapped to corresponding points on the QR-Code symbol. Under the assumption that the width of a module in the QR-code symbol is five (5) pixels, the center of the first module on the first row will be at point (3, 3), the next module on the same row will be at point (8, 3), and so forth. Once each of these points are transformed using the inverse Transform Matrix $T_{Inverse}$, a grid of x and y values in input image space is obtained. The following equation illustrates the transformation of point (X,Y) in the Reference Grid to point (x, y) in input image space:

$$x = \frac{t_{11}X + t_{12}Y + t_{13}}{t_{31}X + t_{32}Y + t_{33}} \quad (20)$$

$$y = \frac{t_{21}X + t_{22}Y + t_{23}}{t_{31}X + t_{32}Y + t_{33}}$$

where $t_{11}$, $t_{12}$, $t_{13}$, $t_{21}$, $t_{22}$, $t_{23}$, $t_{31}$ and $t_{32}$ are from Inverse Matrix, $$T_{inverse} = \begin{pmatrix} t_{11} & t_{12} & t_{13} \\ t_{21} & t_{22} & t_{23} \\ t_{31} & t_{32} & 1 \end{pmatrix} \quad (20)$$

Once the x and y values for a given grid point (X,Y) have been obtained, the pixel value at the given location in the input image can be read. If the pixel value is black, then the bit value is set to 1, otherwise the bit value is set to 0.

Figure 10:
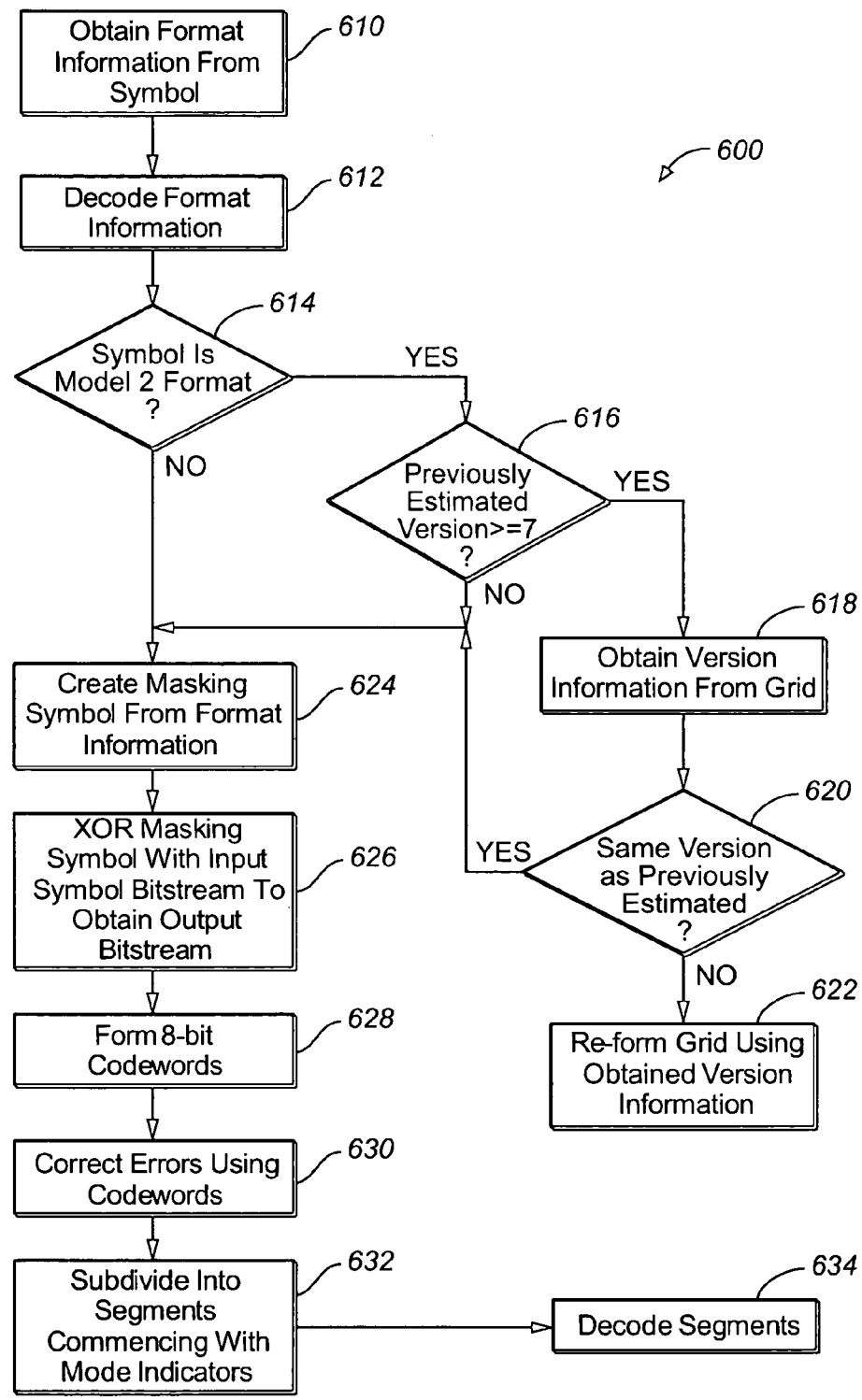
FIG. 10 is a flowchart showing the steps for extracting encoded data from a QR-Code symbol.

FIG. 10 better illustrates the steps for extracting the encoded data from the symbol (step 600). First, the format information is obtained from the grid (step 610) and decoded using error correction (step 612). The format information (see FIG. 1, element 10 and FIG. 2, element 20) consists of a 15-bit sequence comprising five (5) data bits and ten (10) Bose-Chaudhuri-Hocquengem (BCH) error correction bits.

In order to decode the format information, the masking of the format information is released by XORing the 15-bit sequence with the Model 2 Mask pattern 101010000010010 to ensure that the format information bit pattern is not all zeroes. Errors in the masking-released sequence are determined using the well-known BCH (15, 5) error correction method. According to this method, a polynomial whose coefficient is the masking-released sequence is divided by the generator polynomial $G(x)=x^{10}+x^8+x^5+x^4+x^2+x+1$. The coefficient string of the remainder polynomial is appended to the data bit string to form the BCH (15, 5) code string.

If there are no errors found, then the model type is determined to be two (2), the first two (2) Most Significant Bits (MSBs) in the masking-released sequence are the error correction level, and the next three (3) MSBs are the masking pattern reference.

If there are errors found in the masking-released sequence, then the masking of the format information is released by XORing the bit sequence with the Model 1 mask pattern 010100000100101. Errors in the masking-released sequence are determined using the BCH (15,5) error correction method and, if there are no errors, then the model type is determined to be one (1), the first two (2) MSBs are the error correction level, and the next three (3) MSBs are the masking pattern reference. The following example shows how to release the masking of the format information:

EXAMPLE

Model2: Error Correction Level M(00); Mask Pattern 101.
Binary string: 00101
Polynomial: $x^2+1$
Raise power to the (15-5)th: $x^{12}+x^{10}$
Divide by $G(x):=(x^{10}+x^8+x^5+x^4+x^2+x+1)x^2+(x^7+x^6+x^4+x^3+x^2)$
Add Coefficient String of Above Remainder Polynomial to Format Information Data String:
00101+0011011100 ⇒ 001010011011100
XOR with Model 2 mask 101010000010010
Result: 100000011001110

The following further describes how error correction proceeds according to the BCH algorithm, once masking of the format information modules have been released by XORing the bit sequence with the Model 2 mask pattern 101010000010010. The vector R of coefficients to polynomial R(x) is obtained as follows:

$$R=(r0,r1,r2,\ldots,r14)$$

or, $$R(x)=r_0+r_1x+r_2x^2+\ldots+r_{14}x^{14} \quad (21)$$

where:

$r_i(i=0-14)$ is 0 or 1.

Next, the syndromes $S_i(i=1, 3, 5)$ for the vector R are calculated:

$$S1=R(\alpha)=r_0+r_1\alpha+r_2\alpha^2+\ldots r_{14}\alpha^{14} \quad (22)$$

$$S3=R(\alpha)=r_0+r_1\alpha^3+r_2\alpha^6+\ldots r_{14}\alpha^{42} \quad (23)$$

$$S5=R(\alpha)=r_0+r_1\alpha^5+r_2\alpha^{10}+\ldots r_{14}\alpha^{70} \quad (24)$$

where:

$\alpha$ is a primitive element of the field $GF(2^4)$.

Then, the error position is found by obtaining the equations' roots:

$$S_1+\alpha_1=0 \quad (25)$$

$$S_3+S_2\alpha_1+S_1\alpha_2+\alpha_3=0 \quad (26)$$

$$S_5+S_4\alpha_1+S_3\alpha_2+S_2\alpha_3=0 \quad (27)$$

where:

$S_2=S_1$ squared; and
$S_4=S_2$ squared.

The variable $\alpha_i(i=1-3)$ is found for each error position by solving the above equations. Then the variable is substituted for the following polynomial and elements of $GF(2^4)$ are substituted one by one:

$$\alpha(x)=x_3+\alpha_1x^2+\alpha_2x+\alpha_3 \quad (28)$$

In the event that an error is found on the jth digit (counting from the $0^{th}$ digit) for the element $\alpha j$ which makes $\alpha(\alpha j)=0$, the error is corrected by reversing the bit value for each error position.

If the QR-Code symbol is of the Model 2 type (step 614) and its version has been estimated (at step 400) as greater than or equal to seven (7) (step 616), then the version number is verified to ensure it has been estimated correctly. The version information (FIG. 2, element 18) is an 18-bit sequence containing six (6) data bits, with twelve (12) error correction bits calculated using the extended BCH (18, 6) error correction code.

The generator polynomial used in this case is:

$$G(x)=x_{12}+x_{11}+x_{10}+x_9+x_8+x_5+x_2+1 \quad (29)$$

The following example shows how to calculate the version information error correction bits:

EXAMPLE

Version: 7
Binary string: 000111
Polynomial: $x^2+x+1$
Raise power to the (18-6)th: $x^{14}+x^{13}+x^{12}$ Divide by $G(x) := (x^{12}+x^{11}+x^{10}+x^9+x^8+x^5+x^2+1)x^2 + (x^{11}+x^{10}+x^7+x^4+x^2)$ Add Coefficient String of Above Remainder Polynomial to Version Information Data String:

000111+110010010100 ⇒ 000111110010010100

The version number is obtained by checking for errors in the version information at the bottom left of the QR-Code symbol. If there is no error, then the version number is represented by the six (6) most significant bits of the bottom left version information bits. If there is an error, then the version information at the top right of the QR-Code symbol is checked for errors. If there is no error, then the version number is represented by the six (6) most significant bits of the top right version information bits.

Because of the nature of QR-Code, a mathematical formula cannot be employed to locate and correct errors in the version information. Instead, the version information bits must be read from the symbol (step 618) and used to look up version information from the Table below. The row that has the minimum number of difference in bits from the version bits that were read from the QR-Code symbol is considered to be the correct version number.

| Version | Version Information Bit Stream |
|---|---|
| 7 | 00 0111 1100 1001 0100 |
| 8 | 00 1000 0101 1011 1100 |
| 9 | 00 1001 1010 1001 1001 |
| 10 | 00 1010 0100 1101 0011 |
| 11 | 00 1011 1011 1111 0110 |
| 12 | 00 1100 0111 0110 0010 |
| 13 | 00 1101 1000 0100 0111 |
| 14 | 00 1110 0110 0000 1101 |
| 15 | 00 1111 1001 0010 1000 |
| 16 | 01 0000 1011 0111 1000 |
| 17 | 01 0001 0100 0101 1101 |
| 18 | 01 0010 1010 0001 0111 |
| 19 | 01 0011 0101 0011 0010 |
| 20 | 01 0100 1001 1010 0110 |
| 21 | 01 0101 0110 1000 0011 |
| 22 | 01 0110 1000 1100 1001 |
| 23 | 01 0111 0111 1110 1100 |
| 24 | 01 1000 1110 1100 0100 |
| 25 | 01 1001 0001 1110 0001 |
| 26 | 01 1010 1111 1010 1011 |
| 27 | 01 1011 0000 1000 1110 |
| 28 | 01 1100 1100 0001 1010 |
| 29 | 01 1101 0011 0011 1111 |
| 30 | 01 1110 1101 0111 0101 |
| 31 | 01 1111 0010 0101 0000 |
| 32 | 10 0000 1001 1101 0101 |
| 33 | 10 0001 0110 1111 0000 |
| 34 | 01 0010 1000 1011 1010 |
| 35 | 10 0011 0111 1001 1111 |
| 36 | 10 0100 1011 0000 1011 |
| 37 | 10 0101 0100 0010 1110 |
| 38 | 10 0110 1010 0110 0100 |
| 39 | 10 0111 0101 0100 0001 |
| 40 | 10 1000 1100 0110 1001 |

If after having retrieved the version number from the above table, the estimated version number is not the same as the version number retrieved (step 620), the grid is re-formed on the basis of the correct version number (step 622).

Once the grid is determined to have been correctly formed, the bit stream is available. However, the bit stream is masked by a masking symbol generated by the masking condition specified in the format information. As such, the masking symbol must be created using the masking condition which was retrieved from the format information (step 624). In order to release the mask, the masking symbol is XOR'd with the input symbol bitstream to retrieve the actual bit stream (step 626).

From the bit stream, 8-bit codewords are formed using the grid layout specified in the AIM ISS QR-Code Specification referred to above and incorporated herein by reference (step 628).

Errors in the QR-Code symbol are possible due to various factors, including unreliable transmission or label misreads during scanning. However, redundancies built in to the data of the QR-Code symbol make it possible to recover missing or incorrect data to a certain extent from the formed codewords using an error detection and correction scheme (step 630).

One of the most commonly used error detection and correction schemes is the Reed Solomon algorithm, which is a subset of the above-mentioned Bose-Chaudhuri-Hocquenghem (BCH) scheme. Under this scheme, the error correction codewords are generated by a generator polynomial of the form:

$$g(x) = (x - \alpha)(x - \alpha^2)(x - \alpha^3) \ldots (x - \alpha^k) \quad (30)$$
$$= x^k + g_{k-1}x^{k-1} + \ldots + g_1 x + gk$$

The arithmetic is done in modulo m, for some value m. Thus, the possible values for $g_i$ (i=1–k) under modulo m is 0, 1, 2, ... m−1.

$\alpha$ is the primitive element of the polynomial, and has numerous unique properties. For example, $\alpha, \alpha^2, \alpha^3, \ldots, \alpha^{m-1}$ are all unique in modulo m, such that since there are only m−1 values possible under modulo m, there is a unique one to one correspondence between the sets $\{\alpha, \alpha^2, \alpha^3, \ldots, \alpha^{m-1}\}$ and $\{1, 2, 3, \ldots, m-1\}$. Furthermore, the inverse of $\alpha^k$ is $\alpha^{m-k}$, rendering calculation of the inverse very simple. Otherwise, the extended Euclidean Algorithm can be used to calculate the inverse. Multiplication with the primitive element is $\alpha$ raised to the sum of the exponents. Division is $\alpha$ raised to the difference between the exponents. For example, $\alpha^5 \cdot \alpha^3 = \alpha^8$, $\alpha^7/\alpha^3 = \alpha^4$. Lastly, $\alpha^{m-1} = \alpha^0 = 1 \mod m$.

The properties of $\alpha$ behave differently depending on whether the modulo m is a prime number or not. If m is a prime number, then Log and antiLog tables can be generated simply by raising the primitive polynomial to certain exponents and taking the modulo of it. For example, in the case of PDF417 (another two-dimensional symbol), where m is 929 (a prime number) and the primitive element $\alpha$ is 3, $\alpha^7$ is simply $3^7 \pmod{929} = 329$. Furthermore, addition and subtraction follows regular mathematical rules.

If m is not a prime number, then a primitive polynomial has to be determined. An irreducible polynomial p(x) of degree q is primitive if the smallest positive integer n for which p(x) divides $x^n + 1$ is $n = 2^q - 1$. In this case, the Log and antiLog tables are constructed using this primitive polynomial. For example, in the case of QR-Code, where the primitive polynomial is $p(x) = x^8 + x^4 + x^3 + x^2 + 1$ and $\alpha$ is 2, $\alpha^8 = \alpha^4 + \alpha^3 + \alpha^2 + 1 = 00011101 = 29$ (Note: $\alpha$ is the root of the polynomial p(x)). Another example is $\alpha^{10} = \alpha^2 \alpha^8 = \alpha^2(\alpha^4 + \alpha^3 + \alpha^2 + 1) = \alpha^6 + \alpha^5 + \alpha^4 + \alpha^2 = 01110100 = 116$. Addition and subtraction is the result of performing an XOR operation on the two parameters.

A particular number of error correction codewords is incorporated into any given QR-Code symbol. The error correction codeword algorithm used allows two types of error to be recovered, namely an erasure, which is a missing or undecodable codeword at a known position, and a substitution error, which is an erroneously decoded codeword at an unknown position.

The error correction scheme requires one error correction codeword to rectify an erasure and two error correction codewords to recover a substitution error. Thus, a given number of error correction codewords can rectify any combination of substitution errors and erasures which satisfy the following equation:

$$e+2t \leq k-2 \quad (31)$$

e=Number of erasures
t=Number of substitution errors
k=Number of error correction codewords.

The unknown codewords are substituted by zeros and the position of the $l^{th}$ unknown codeword is $j_l$ for l=1, 2 . . . , v.

The symbol character polynomial is constructed:

$$C(x)=C_{n-1}x^{n-1}+C_{n-2}x^{n-2}+\ldots+C_1x+C_0 \quad (32)$$

where: the n coefficients are the codewords read, with $C_{n-1}$ being the first codeword
n=total number of codewords The k syndrome values $S_1$ to $S_k$ are calculated by evaluating:

$$C(x) \text{ at } x=\alpha^i \quad (33)$$

for i=1 to i=k
where k=number of error correction codewords in the symbol.

Since the locations of unknown codewords in the symbol are known from $j_l$ for l=1, 2, . . . , v, the error location polynomial for these known positions can be computed:

$$\sigma(x) = (1 - \beta_1 x)(1 - \beta_2 x) \ldots (1 - \beta_v x) \quad (34)$$
$$= 1 + \sigma_1 x + \ldots + \sigma_v x^v$$

where: $\beta_1 = \alpha^{j_l}$

The error location polynomial, $\sigma(x)$, can be updated to include the position of errors. This can be done by using the Berlekamp-Massey algorithm, as would be understood by one of ordinary skill in the art.

At this point, the erasures and substitution errors are verified to ensure that they satisfy the appropriate error correction capacity previously calculated.

Solving $\sigma(x)=0$ yields the position of the errors t, where t>=0; if t=0 there is no error. The error values, $e_{j_l}$ for locations $j_l$, l=1, . . . , v+t must be computed. To compute the error values, one auxiliary polynomial is needed which is defined by:

$$\Omega(x)=1+(s_1+\sigma_1)x+(s_2+\sigma_1 s_1+\sigma_2)x^2+\ldots+(s_\eta+\sigma_1 s_{\eta-1}+\sigma_2 s_{\eta-2}+\ldots+\sigma_\eta)x^\eta \quad (35)$$

where: $\eta=v+t$
The error value at location $j_l$ is thus given by:

$$e_{j_l} = \frac{\Omega(\beta_l^{-1})}{\beta_l \prod_{\substack{i=1 \\ i \neq l}}^{\eta} (1 - \beta_i \beta_l^{-1})} \quad (36)$$

After solving for the error values, the complements of the error values are added to the codewords in the corresponding locations.

With the errors detected and corrected, the data bit stream is subdivided into segments, each of which commences with a Mode Indicator (a four (4) bit identifier indicating in which mode the next data sequence is encoded i.e. alphanumeric, numeric, byte) and has a length determined by a Character Count Indicator (a bit sequence which defines the data string length in a mode) following the Mode Indicator (step 632). Each segment is then decoded (step 634) according to the determined mode, as will be readily understood by one of ordinary skill in the art.

Decoding Example

Figure 22:
FIG. 22 is a digital image of another scene that includes a QR-Code symbol finder pattern.

The above-described method was applied to the sample digital image shown in FIG. 22, which contains a QR-Code symbol rotated 180 degrees, and that has thirty (30) degrees of skew and pitch. The input digital image was captured with a camera that was fifty (50) mm from the QR-Code symbol.

Figure 23:
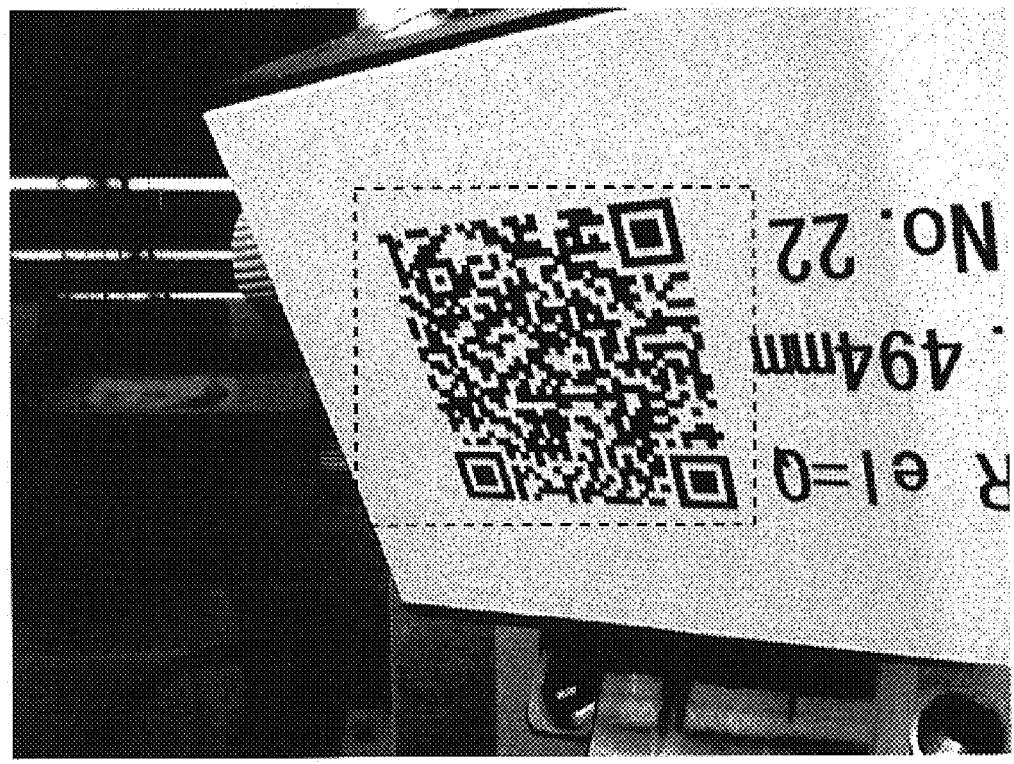
FIG. 23 shows the identification of QR-Code symbol candidates from the digital image of FIG. 22.

FIG. 23 shows a rectangle bounding the region of edge count squares which form the QR-Code symbol, determined using the above-described edge count location method.

Figure 24:
FIG. 24 shows an isolated QR-Code symbol candidate.

FIG. 24 shows the threshold image of the bounded region. The threshold value for the input region was determined to be eighty-six (86).

In the region shown bounded in FIG. 23, five finder pattern candidates were identified. The following table includes the centers of the five located finder pattern candidates and their calculated confidence level.

| Candidates | Confidence Level |
| --- | --- |
| (182, 33) | 8 |
| (86, 137) | 1 |
| (78, 188) | 6 |
| (219, 193) | 7 |
| (191, 182) | 1 |

Figure 25:
FIG. 25 shows the center points of the top three candidate finder patterns in the isolated QR-Code symbol candidate of FIG. 24.

The top 3 candidates were selected, as shown in FIG. 25.

The number of modules in the timing pattern was calculated by determining that the input symbol has thirty-seven (37) modules in one row and the version was determined to be version five (5).

Figure 26:
FIG. 26 shows a first labeling of the finder patterns in the isolated QR-Code symbol candidate of FIG. 25.
Figure 27:
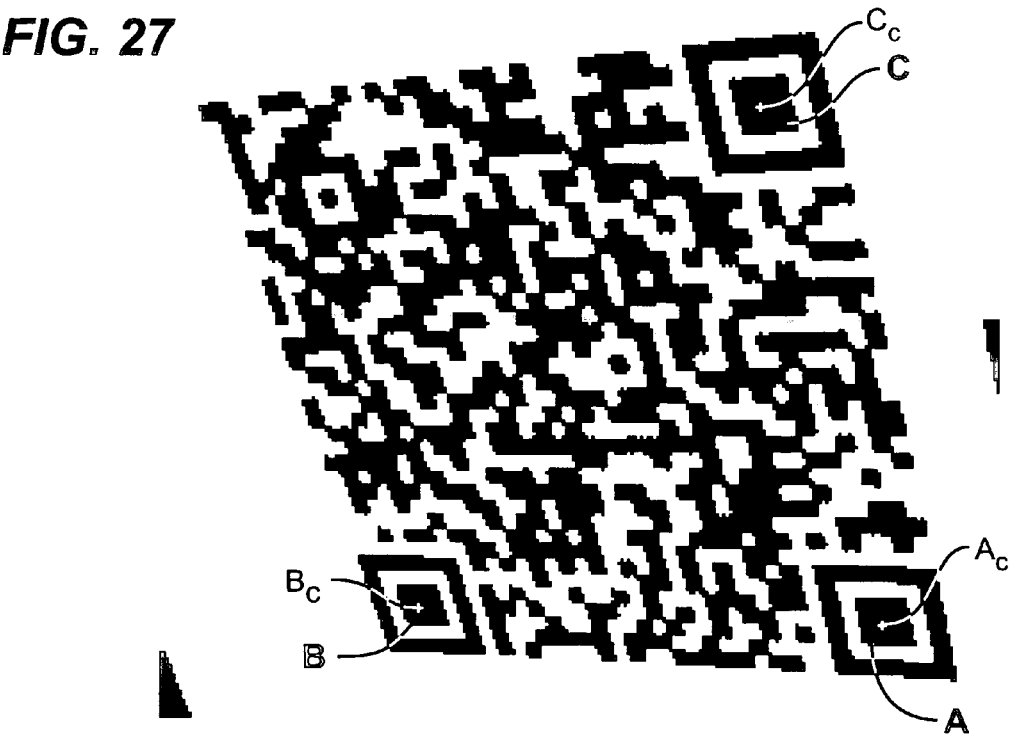
FIG. 27 shows the final labeling of the finder patterns of the QR-Code symbol in FIG. 26 after orientation.

FIG. 26 shows the initial allocation of finder patterns A, B and C, prior to orientation. After orientation as described above, the allocation of finder patterns A, B and C was adjusted to identify A as the top left finder pattern, as shown in FIG. 27.

In order to estimate the four corners $A_{co}$, $B_{co}$, $C_{co}$ and $D_{co}$ of the QR-Code symbol, a left line was formed using edges of finder patterns A and C, a top line was formed using edges of finder patterns A and B, a right line was formed using an edge of finder pattern B and a bottom line was formed using an edge of finder pattern C.

Figure 28:
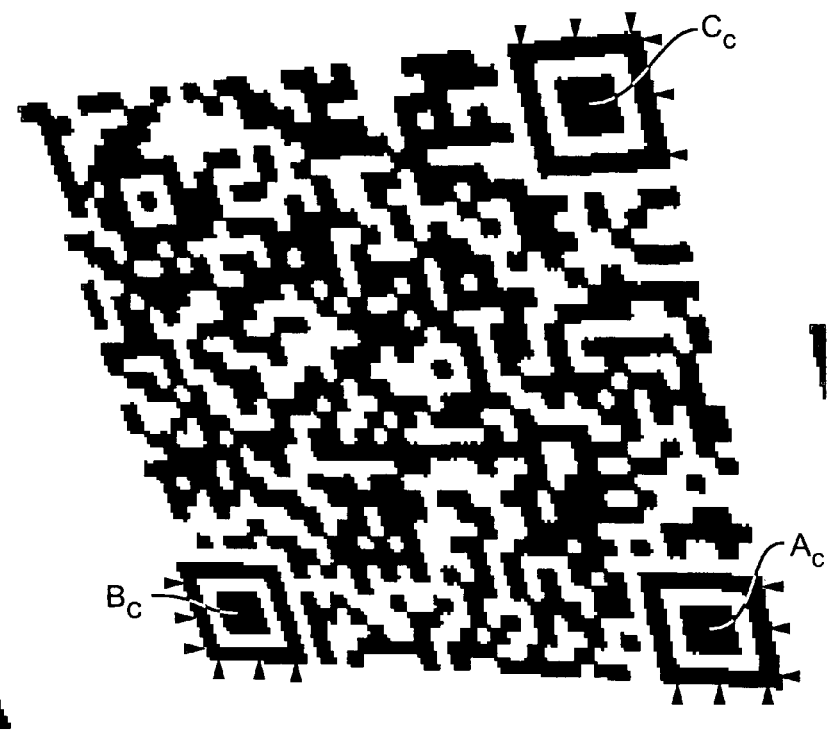
FIG. 28 shows the points on the three finder patterns of the QR-Code symbol used for locating the first three corners of the QR-Code symbol.

FIG. 28 shows the points of the respective ones of finder patterns A, B and C that were used in order to determine the left, top, right and bottom lines.

For the left line, the following six (6) edge points were identified: {(241, 202), (239, 193), (237, 182), (207, 44), (204, 33), (202, 21)}. By employing the least squares line fitting method, the following equation for the left line was determined to be:

LeftLine: $y=4.606947x-908.706543$

For the top line, the following six (6) points were identified: {(235, 210), (222, 209), (214, 209), (91, 203), (81, 202), (74, 202)}. By employing the least squares line fitting method, the following equation for the top line was determined to be:

TopLine: $y=0.049478x+198.271454$

For the right line, the following three (3) points were identified: {(67, 195), (64, 187), (61, 178)}. By employing the least squares line fitting method, the following equation for the right line was determined to be:

RightLine: $2.833333x+5.333338$

For the bottom line, the following three (3) points were identified: {(189,10), (177, 11), (167, 12)}. By employing the least squares line fitting method, the following equation for the bottom line was determined to be:

BottomLine: $-0.090659x+27.107143$

The positions of the symbol corners were then determined by finding the intersection points of the top, left and bottom lines. In particular, the intersection point between the top line and the left line was found to be (242, 210). The intersection point between the top line and the right line was found to be (69, 201). The intersection point between the bottom line and the left line was found to be (199, 9). The intersection point between the bottom line and the right line was found to be (7, 26).

Figure 29:
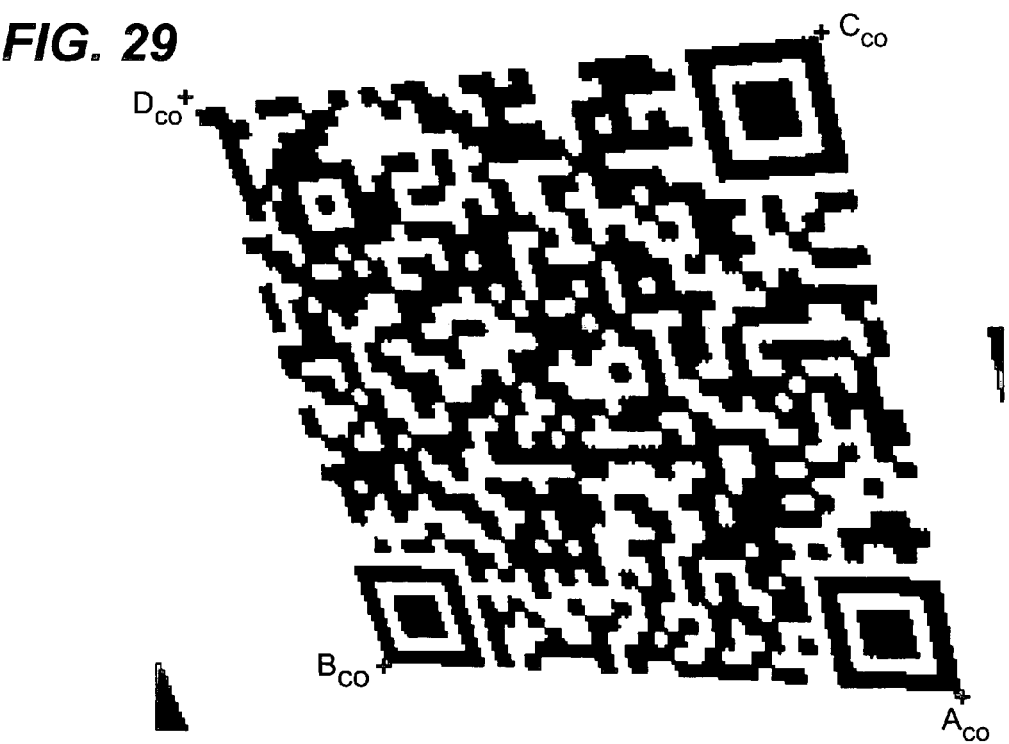
FIG. 29 shows the estimated corners and an inaccurate fourth corner of the QR-Code symbol.

Using all of the lines, four corners could have been identified as shown in FIG. 29. As can be seen in FIG. 29, using the line to identify symbol corner $D_{co}$ clearly yields an inaccurate result. Due to skew and pitch, the least squares fitted bottom line and right line do not intersect at the bottom right corner of the input QR-Code symbol. However, the above-described method for obtaining the fourth corner accounted for this skew and pitch and located the fourth corner as shown in FIG. 30 at (10, 30).

In order to estimate the Transform Matrix, the four vertices of the input image symbol {(242, 210), (69, 201), (10, 30), (199, 9)} were used. The destination vertices of the Reference Grid were {(0, 0), (555, 0), (555, 555), (0, 555)}. In order to estimate the Transform Matrix, the following linear system of equations was solved:

$$\begin{pmatrix} 242 & 210 & 1 & 0 & 0 & 0 & 0 & 0 \\ 0 & 0 & 0 & 242 & 210 & 1 & 0 & 0 \\ 69 & 201 & 1 & 0 & 0 & 0 & -(555)\times(69) & -(555)\times(201) \\ 0 & 0 & 0 & 69 & 201 & 1 & 0 & 0 \\ 10 & 30 & 1 & 0 & 0 & 0 & -(555)\times(10) & -(555)\times(30) \\ 0 & 0 & 0 & 10 & 30 & 1 & -(555)\times(10) & -(555)\times(30) \\ 199 & 9 & 1 & 0 & 0 & 0 & 0 & 0 \\ 0 & 0 & 0 & 199 & 9 & 1 & -(555)\times(199) & -(555)\times(9) \end{pmatrix} \begin{pmatrix} t_{11} \\ t_{12} \\ t_{13} \\ t_{21} \\ t_{22} \\ t_{23} \\ t_{31} \\ t_{32} \end{pmatrix} =$$

$$\begin{pmatrix} 0 \\ 0 \\ 555 \\ 0 \\ 555 \\ 555 \\ 0 \\ 555 \end{pmatrix}$$

where $t_{11}$, $t_{12}$, $t_{13}$, $t_{21}$, $t_{22}$, $t_{23}$, $t_{31}$ and $t_{32}$ are from Matrix, $$T_{forward} = \begin{pmatrix} t_{11} & t_{12} & t_{13} \\ t_{21} & t_{22} & t_{23} \\ t_{31} & t_{32} & 1 \end{pmatrix}$$

The Transform Matrix was determined to be:

$$T_{forward} = \begin{pmatrix} -2.810353 & 0.601220 & 553.849243 \\ 0.168458 & -3.238136 & 639.241821 \\ 0.000846 & -0.000956 & 1.000000 \end{pmatrix}$$

While not obtained during the decoding method described herein, for the purpose of illustration, FIG. 31 shows what the symbol of FIG. 30 would have been transformed to using the Transform Matrix. In order to find the inverse Transform Matrix $T_{inverse}$, the following linear system of equations was solved:

$$\begin{pmatrix} 0 & 0 & 1 & 0 & 0 & 0 & 0 & 0 \\ 0 & 0 & 0 & 0 & 0 & 1 & 0 & 0 \\ 555 & 0 & 1 & 0 & 0 & 0 & -69\times555 & 0 \\ 0 & 0 & 0 & 555 & 0 & 1 & -201\times555 & 0 \\ 555 & 555 & 1 & 0 & 0 & 0 & -10\times555 & -10\times555 \\ 0 & 0 & 0 & 555 & 555 & 1 & -30\times555 & -30\times555 \\ 0 & 555 & 1 & 0 & 0 & 0 & 0 & -199\times555 \\ 0 & 0 & 0 & 0 & 555 & 1 & 0 & -9\times555 \end{pmatrix} \begin{pmatrix} t_{11} \\ t_{12} \\ t_{13} \\ t_{21} \\ t_{22} \\ t_{23} \\ t_{31} \\ t_{32} \end{pmatrix} = \begin{pmatrix} 242 \\ 210 \\ 69 \\ 201 \\ 10 \\ 30 \\ 199 \\ 9 \end{pmatrix}$$

where $t_{11}$, $t_{12}$, $t_{13}$, $t_{21}$, $t_{22}$, $t_{23}$, $t_{31}$ and $t_{32}$ are from Matrix, $$T_{inverse} = \begin{pmatrix} t_{11} & t_{12} & t_{13} \\ t_{21} & t_{22} & t_{23} \\ t_{31} & t_{32} & 1 \end{pmatrix}$$

The inverse Transform Matrix $T_{inverse}$ was determined to be:

$$T_{inverse} = \begin{pmatrix} -0.291951 & -0.125623 & 242.000000 \\ 0.041349 & -0.364340 & 210.000000 \\ 0.000286 & -0.000242 & 1.000000 \end{pmatrix}$$

To form the Reference Grid over the QR-Code symbol, the size of the modules in the Reference Grid must first have been known. Since the width of the transformed symbol was 555, the width of a module was 555/37=15 pixels. Using this value, the Reference Grid was formed as shown in FIG. 32. To form the grid in input image space using the Reference Grid, the following calculation was done for every point (X,Y) on the Reference Grid according to Equations 14 and 15.

FIG. 33 shows the transformed points on the input image of the QR-Code symbol.

At each of the transformed Reference Grid points, the pixel value was read and stored in a grid array. A black pixel yielded a bit value of one (1), and a white pixel yielded a bit value of zero (0). The grid array that contained the bit stream is shown in FIG. 34.

For the input image, the Format Information was 010010010110100. By XORing with 101010000010010, Model 2 Mask Pattern, the following pattern was obtained:

111000010100110. Since there were no errors, the Error Correction Level was eleven (11) and the Masking Pattern Reference was one-hundred (100), which gave the condition (2i+3j) mod 2=0.

Since a Model 2 Masking pattern was used, the model of the QR-Code symbol was two (2).

The number of modules estimated previously in one row was thirty-seven (37). Therefore, the version number was five (5). Since the version was less than seven (7), it was determined that the version information would not be included in the symbol.

To unmask the grid, the unmasking grid was generated using the condition: (2i+j) mod 2=0.

Figure 35:
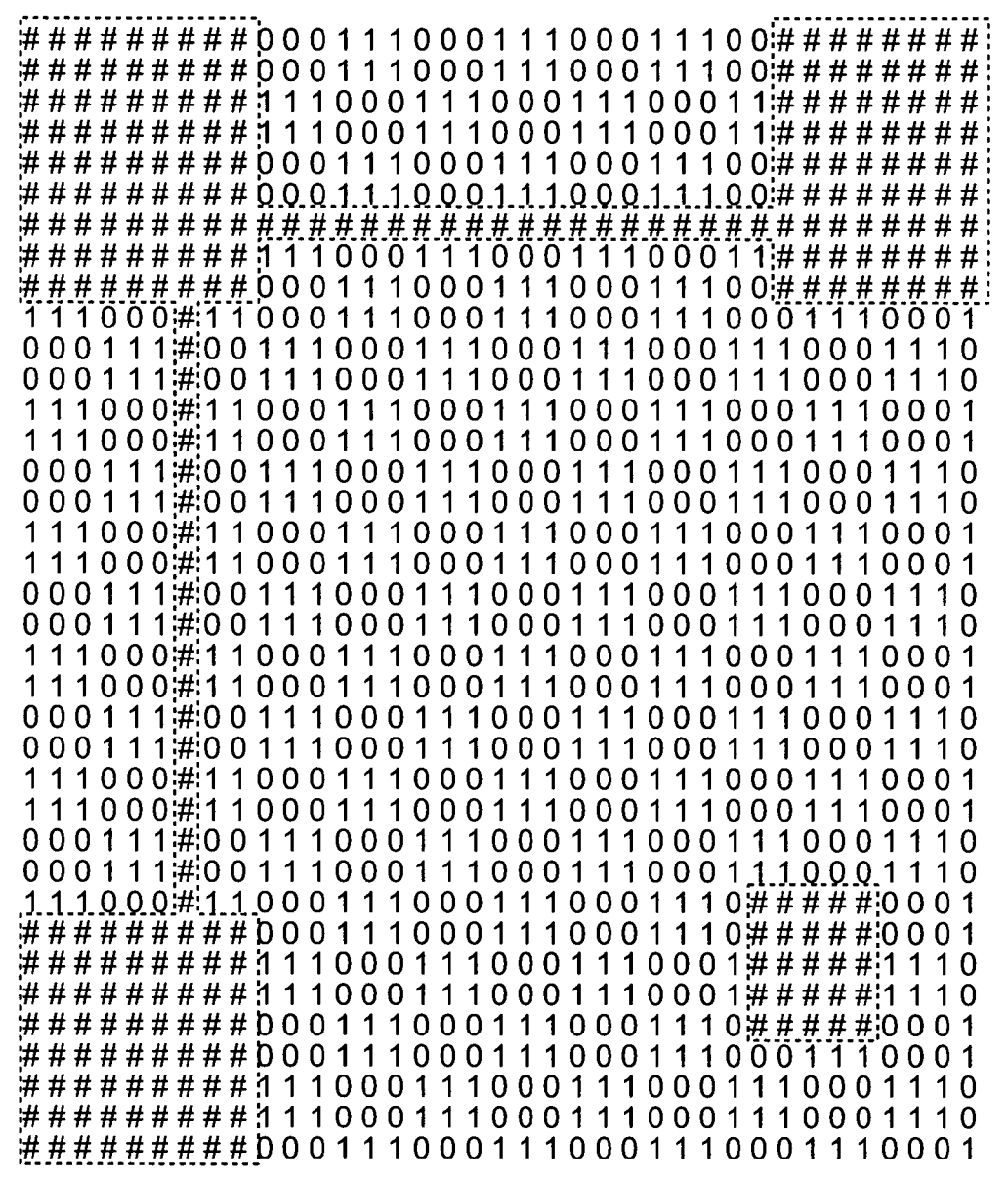
Figure 36:
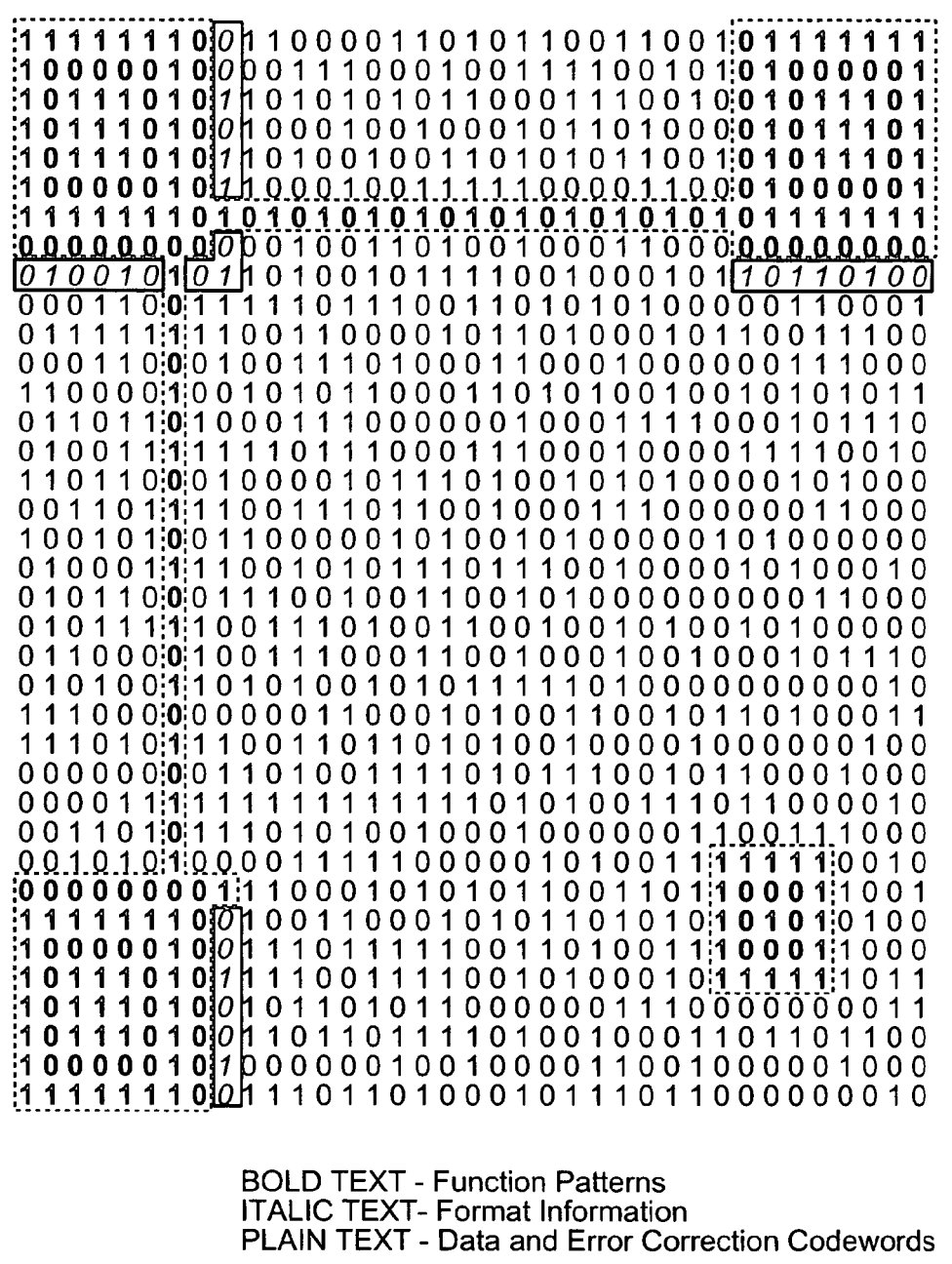

The unmasking grid array that was used for the input digital image is shown in FIG. 35. By XORing the bits in the grid array of FIG. 34 with the unmasking grid array from FIG. 35, the unmasked grid array shown in FIG. 36 was obtained.

Figure 37:
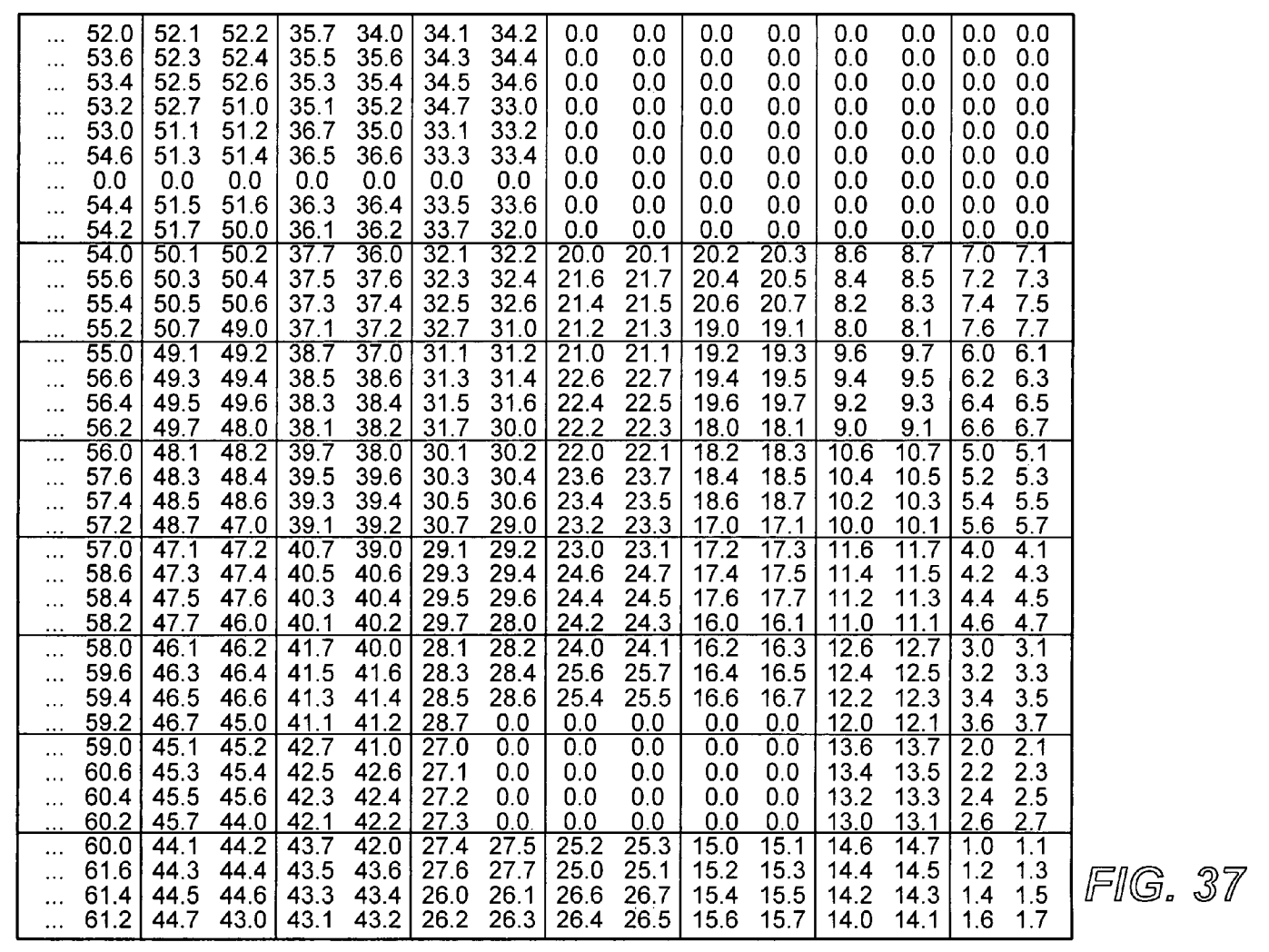

The partial codeword placement grid for a version 5, Model 2 QR-Code symbol is shown in FIG. 37. In the grid of FIG. 37, the value before a decimal point indicates the codeword index, and the value after the decimal point indicates the bit index in the codeword. For example, 1.7 indicates that the bit value is from first codeword and the 7th bit (the most significant bit) in the codeword. The following table illustrates the formation of the first codeword, which is determined to have a decimal value of sixty-seven (67):

| 1.7 | 1.6 | 1.5 | 1.4 | 1.3 | 1.2 | 1.1 | 1.0 |
|-----|-----|-----|-----|-----|-----|-----|-----|
| 0   | 1   | 0   | 0   | 0   | 0   | 1   | 1   |

Having proceeded with codeword formation as described, the codewords retrieved from the unmasked grid were: {67, 194, 68, 53, 4, 5, 194, 53, 197, 4, 194, 68, 101, 52, 4, 192, 69, 146, 117, 236, 68, 194, 68, 17, 194, 5, 197, 236, 194, 4, 2, 17, 4, 52, 194, 236, 197, 146, 4, 17, 100, 213, 133, 236, 52, 130, 53, 17, 212, 194, 68, 236, 245, 4, 194, 17, 50, 117, 194, 236, 5, 17, 76, 82, 188, 92, 188, 250, 221, 21, 57, 239, 36, 72, 174, 202, 225, 42, 241, 61, 228, 222, 148, 91, 224, 35, 49, 38, 43, 53, 142, 234, 44, 77, 111, 61, 38, 150, 177, 187, 207, 137, 150, 250, 162, 57, 138, 163, 130, 96, 157, 32, 233, 190, 230, 125, 138, 221, 218, 94, 233, 237, 78, 2, 114, 224, 179, 69, 194, 92, 71, 88, 213, 94}.

According to Table 9A-1 in the above-identified AIM QR-Code specification document, codewords are divided into four (4) blocks for Version 5 Model 2 QR-Code with Error Correction Level 11 as follows:

Block 1 Data Codewords {67, 4, 197, 101, 69, 68, 194, 194, 4, 197, 100, 52, 212, 245, 50}

Block 1 Error Correcting Codewords {76, 188, 57, 174, 241, 148, 49, 142, 111, 177, 150, 138, 157, 230, 218, 78, 179, 71}

Block 2 Data Codewords {194, 5, 4, 52, 146, 194, 5, 4, 52, 146, 213, 130, 194, 4, 117}

Block 2 Error Correcting Codewords {82, 250, 239, 202, 61, 91, 38, 234, 61, 187, 250, 163, 32, 125, 94, 2, 69, 88}

Block 3 Data Codewords {68, 194, 194, 4, 117, 68, 197, 2, 194, 4, 133, 53, 68, 194, 194, 5}

Block 3 Error Correcting Codewords {188, 221, 36, 225, 228, 224, 43, 44, 38, 207, 162, 130, 233, 138, 233, 114, 194, 213}

Block 4 Data Codewords {53, 53, 68, 192, 236, 17, 236, 17, 236, 17, 236, 17, 236, 17, 236, 17}

Block 4 Error Correcting Codewords {92, 21, 72, 42, 222, 35, 53, 77, 150, 137, 57, 96, 190, 221, 237, 224, 92, 94}

Using the Block 1 Data codewords and Error Correcting codewords, the following character polynomial was obtained:

$$C(x) = 67x^{32} \oplus 4x^{31} \oplus 197x^{30} \oplus 101x^{29} \oplus 69x^{28} \oplus 68x^{27} \oplus 194x^{26} \oplus$$
$$194x^{25} \oplus 4x^{24} \oplus 197x^{23} \oplus 100x^{22} \oplus 52x^{21} \oplus 212x^{20} \oplus 245x^{19} \oplus 50x^{18} \oplus$$
$$76x^{17} \oplus 188x^{16} \oplus 57x^{15} \oplus 174x^{14} \oplus 241x^{13} \oplus 148x^{12} \oplus 49x^{11} \oplus$$
$$142x^{10} \oplus 111x^{9} \oplus 177x^{8} \oplus 150x^{7} \oplus 138x^{6} \oplus 157x^{5} \oplus 230x^{4} \oplus 218x^{3} \oplus$$
$$78x^{2} \oplus 179x \oplus 71$$

Where:
n=33
k=18
α=2
The primitive polynomial is $p(x)=x^8+x^4+x^3+x^2+1$.
⊕ is XOR
The syndromes were computed as follows:

$$S_1 = C(\alpha)$$
$$= C(2)$$
$$= 67(2^{32}) \oplus 4(2^{31}) \oplus 197(2^{30}) \oplus 101(2^{29}) \oplus 69(2^{28}) \oplus 68(2^{27}) \oplus$$
$$194(2^{26}) \oplus 194(2^{25}) \oplus 4(2^{24}) \oplus 197(2^{23}) \oplus 100(2^{22}) \oplus 52(2^{21}) \oplus$$
$$212(2^{20}) \oplus 245(2^{19}) \oplus 50(2^{18}) \oplus 76(2^{17}) \oplus 188(2^{16}) \oplus 57(2^{15}) \oplus$$
$$174(2^{14}) \oplus 241(2^{13}) \oplus 148(2^{12}) \oplus 49(2^{11}) \oplus 142(2^{10}) \oplus 111(2^{9}) \oplus$$
$$177(2^{8}) \oplus 150(2^{7}) \oplus 138(2^{6}) \oplus 157(2^{5}) \oplus 230(2^{4}) \oplus 218(2^{3}) \oplus 78(2^{2}) \oplus$$
$$179(2) \oplus 71$$

Using the log table in FIG. 40, the following was obtained:

$$S_1 = 2^{98}2^{32} \oplus 2^{2}2^{31} \oplus 2^{123}2^{30} \oplus 2^{72}2^{29} \oplus 2^{221}2^{28} \oplus 2^{102}2^{27} \oplus 2^{67}2^{26} \oplus$$
$$2^{67}2^{25} \oplus 2^{2}2^{24} \oplus 2^{123}2^{23} \oplus 2^{195}2^{22} \oplus 2^{106}2^{21} \oplus 2^{41}2^{20} \oplus 2^{231}2^{19} \oplus$$
$$2^{194}2^{18} \oplus 2^{16}2^{17} \oplus 2^{71}2^{16} \oplus 2^{154}2^{15} \oplus 2^{190}2^{14} \oplus 2^{174}2^{13} \oplus 2^{38}2^{12} \oplus$$
$$2^{181}2^{11} \oplus 2^{254}2^{10} \oplus 2^{61}2^{9} \oplus 2^{86}2^{8} \oplus 2^{180}2^{7} \oplus 2^{222}2^{6} \oplus 2^{32}2^{5} \oplus 2^{160}2^{4} \oplus$$
$$2^{134}2^{3} \oplus 2^{34}2^{2} \oplus 2^{171}2 \oplus 2^{253}$$

$$S_1 = 2^{130} \oplus 2^{33} \oplus 2^{153} \oplus 2^{101} \oplus 2^{249} \oplus 2^{129} \oplus 2^{93} \oplus 2^{92} \oplus 2^{26} \oplus 2^{146} \oplus$$
$$2^{217} \oplus 2^{127} \oplus 2^{61} \oplus 2^{250} \oplus 2^{212} \oplus 2^{33} \oplus 2^{87} \oplus 2^{169} \oplus 2^{204} \oplus 2^{187} \oplus 2^{50} \oplus$$
$$2^{192} \oplus 2^{9} \oplus 2^{70} \oplus 2^{94} \oplus 2^{187} \oplus 2^{228} \oplus 2^{37} \oplus 2^{164} \oplus 2^{137} \oplus 2^{36} \oplus 2^{172} \oplus$$
$$2^{253}$$

$$S_1 = 46 \oplus 39 \oplus 146 \oplus 34 \oplus 54 \oplus 23 \oplus 182 \oplus 91 \oplus 6 \oplus 154 \oplus 155 \oplus 204 \oplus$$
$$111 \oplus 108 \oplus 121 \oplus 39 \oplus 127 \oplus 229 \oplus 221 \oplus 220 \oplus 5 \oplus 130 \oplus 58 \oplus 94 \oplus$$
$$113 \oplus 220 \oplus 61 \oplus 74 \oplus 198 \oplus 158 \oplus 37 \oplus 123 \oplus 71$$

$$S_1 = 0$$

The rest of the computed syndromes were: $S_1=S_2=\ldots=S_{18}=0$. Since all of the computed syndromes were equal to zero, there was no error in the block.

In order to illustrate error detection and correction, should the 31st codeword have had a 1-bit error (instead of four (4), the value was five (5)), and the value of the 30$^{th}$ codeword unknown, the character polynomial would have been:

$$C(x) = 67x^{32} \oplus 5x^{31} \oplus 101x^{29} \oplus 69x^{28} \oplus 68x^{27} \oplus 194x^{26} \oplus 194x^{25} \oplus$$
$$4x^{24} \oplus 197x^{23} \oplus 100x^{22} \oplus 52x^{21} \oplus 212x^{20} \oplus 245x^{19} \oplus 50x^{18} \oplus$$
$$76x^{17} \oplus 188x^{16} \oplus 57x^{15} \oplus 174x^{14} \oplus 241x^{13} \oplus 148x^{12} \oplus 49x^{11} \oplus$$
$$142x^{10} \oplus 111x^9 \oplus 177x^8 \oplus 150x^7 \oplus 138x^6 \oplus 157x^5 \oplus 230x^4 \oplus$$
$$218x^3 \oplus 78x^2 \oplus 179x \oplus 71$$

$$S_1 = C(\alpha)$$
$$= C(2)$$
$$= 67(2^{32}) \oplus 5(2^{31}) \oplus 101(2^{29}) \oplus 69(2^{28}) \oplus 68(2^{27}) \oplus 194(2^{26}) \oplus$$
$$194(2^{25}) \oplus 4(2^{24}) \oplus 197(2^{23}) \oplus 100(2^{22}) \oplus 52(2^{21}) \oplus 212(2^{20}) \oplus$$
$$245(2^{19}) \oplus 50(2^{18}) \oplus 76(2^{17}) \oplus 188(2^{16}) \oplus 57(2^{15}) \oplus 174(2^{14}) \oplus$$
$$241(2^{13}) \oplus 148(2^{12}) \oplus 49(2^{11}) \oplus 142(2^{10}) \oplus 111(2^9) \oplus 177(2^8) \oplus$$
$$150(2^7) \oplus 138(2^6) \oplus 157(2^5) \oplus 230(2^4) \oplus 218(2^3) \oplus 78(2^2) \oplus$$
$$179(2) \oplus 71$$

Using the log table in FIG. 40, the following would have been obtained:

$$S_1 = 2^{98}2^{32} \oplus 2^{50}2^{31} \oplus 2^{72}2^{29} \oplus 2^{221}2^{28} \oplus 2^{102}2^{27} \oplus 2^{67}2^{26} \oplus 2^{67}2^{25} \oplus$$
$$2^22^{24} \oplus 2^{123}2^{23} \oplus 2^{195}2^{22} \oplus 2^{106}2^{21} \oplus 2^{41}2^{20} \oplus 2^{231}2^{19} \oplus 2^{194}2^{18} \oplus$$
$$2^{16}2^{17} \oplus 2^{71}2^{16} \oplus 2^{154}2^{15} \oplus 2^{190}2^{14} \oplus 2^{174}2^{13} \oplus 2^{38}2^{12} \oplus 2^{181}2^{11} \oplus$$
$$2^{254}2^{10} \oplus 2^{61}2^9 \oplus 2^{88}2^8 \oplus 2^{180}2^7 \oplus 2^{222}2^6 \oplus 2^{32}2^5 \oplus 2^{160}2^4 \oplus 2^{134}2^3 \oplus$$
$$2^{34}2^2 \oplus 2^{171}2 \oplus 2^{253}$$

$$S_1 = 2^{130} \oplus 2^{81} \oplus 2^{101} \oplus 2^{249} \oplus 2^{129} \oplus 2^{93} \oplus 2^{92} \oplus 2^{26} \oplus 2^{146} \oplus 2^{217} \oplus$$
$$2^{127} \oplus 2^{61} \oplus 2^{250} \oplus 2^{212} \oplus 2^{33} \oplus 2^{87} \oplus 2^{169} \oplus 2^{204} \oplus 2^{187} \oplus 2^{50} \oplus$$
$$2^{192} \oplus 2^9 \oplus 2^{70} \oplus 2^{94} \oplus 2^{187} \oplus 2^{228} \oplus 2^{37} \oplus 2^{164} \oplus 2^{137} \oplus 2^{36} \oplus$$
$$2^{172} \oplus 2^{253}$$

$$S_1 = 46 \oplus 231 \oplus 34 \oplus 54 \oplus 23 \oplus 182 \oplus 91 \oplus 6 \oplus 154 \oplus 155 \oplus 204 \oplus$$
$$111 \oplus 108 \oplus 121 \oplus 39 \oplus 127 \oplus 229 \oplus 221 \oplus 220 \oplus 5 \oplus 130 \oplus 58 \oplus 94 \oplus$$
$$113 \oplus 220 \oplus 61 \oplus 74 \oplus 198 \oplus 158 \oplus 37 \oplus 123 \oplus 71$$

$$S_1 = 82.$$

The computed syndromes would have been:

$$\{S_1, S_2, \ldots, S_{18}\} = \{82, 26, \ldots, 93\}$$

The final error locator polynomial would have been:

$$\sigma(x) = 1 + 160x + 111x^2$$

To find the roots of the polynomial $\sigma(x)$, $\sigma(x)$ would have been set to 0, yielding the two distinct roots $\alpha^{224}=18$ and $\alpha^{225}=36$. Thus, the two errors would have been detected at the 30th and 31st positions in the codeword sequence.

The error value would have been found using the auxiliary polynomial:

$$\Omega(x) = \alpha^{183}x + \alpha^{210}$$

Using the auxiliary polynomial and the roots of the error locator polynomial, the error value would have been $e_{30}=197$ and $e_{31}=4$.

The errors would have then been corrected in the codeword sequence.

Figures 38, 39:
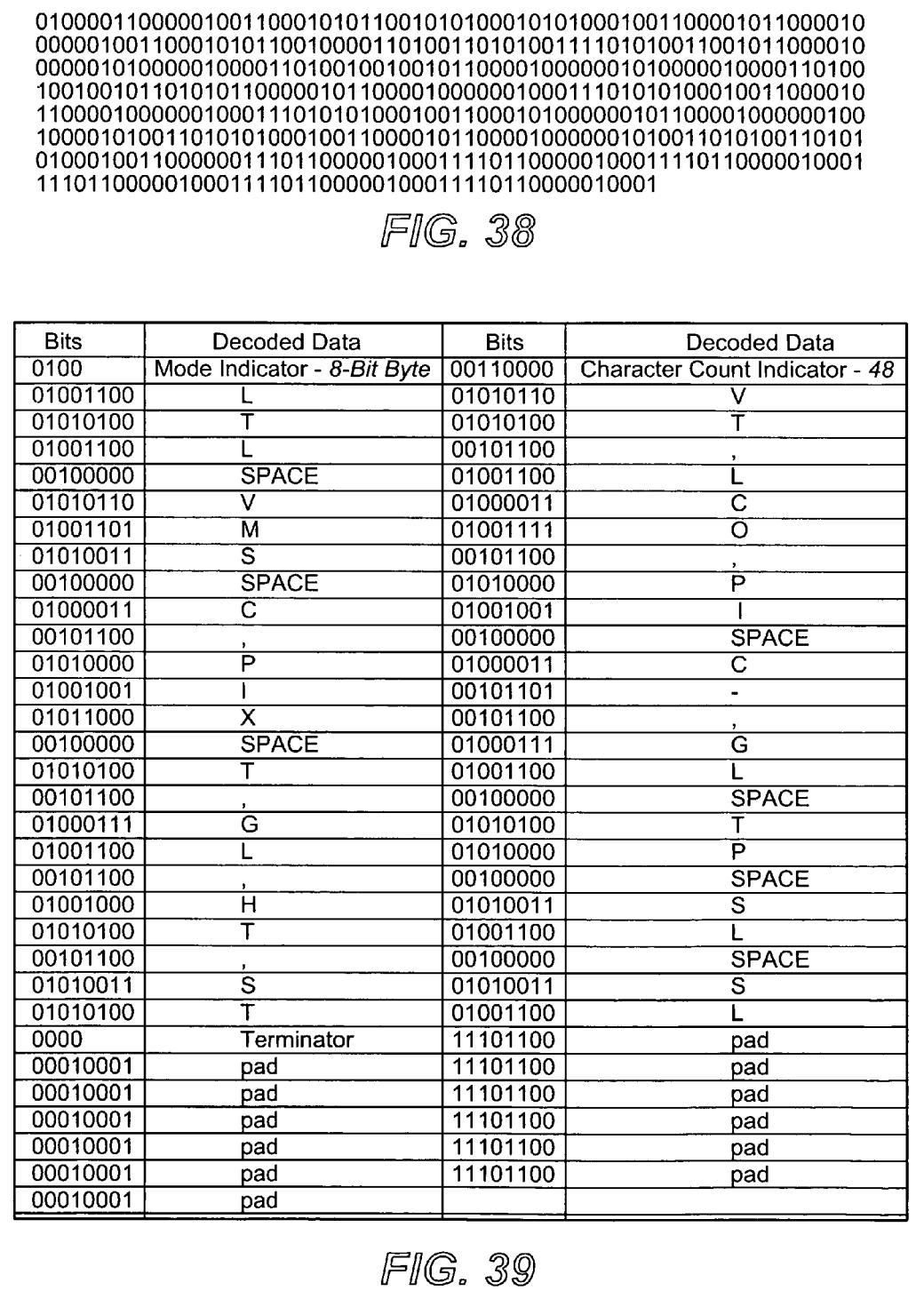

After the error correction algorithm was applied to all four blocks of codewords, the bit stream shown in FIG. 38 was obtained. The bit stream was decoded as shown in FIG. 39, finally yielding the decoded message as follows:

"LVTTL, LVCMOS, PCI, PCI-X, GTL, GTLP, HSTL, SSTL"

Figure 8:
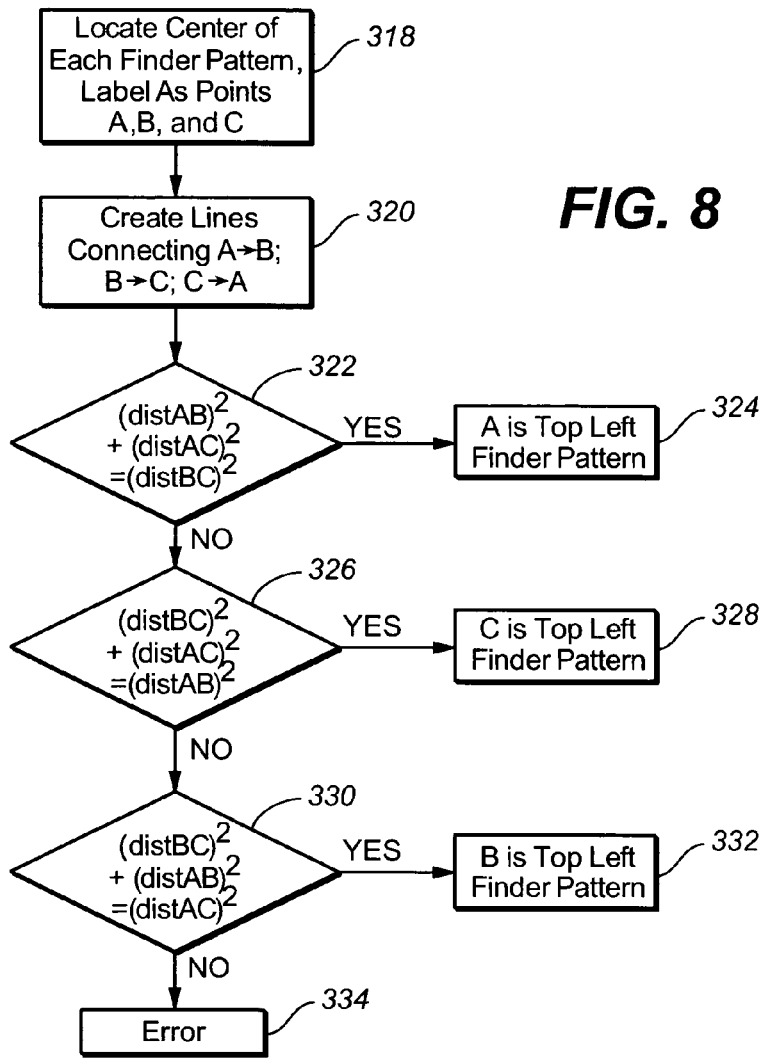
FIG. 8 is a flowchart showing alternative steps for orienting a QR-Code symbol.
Figure 14:
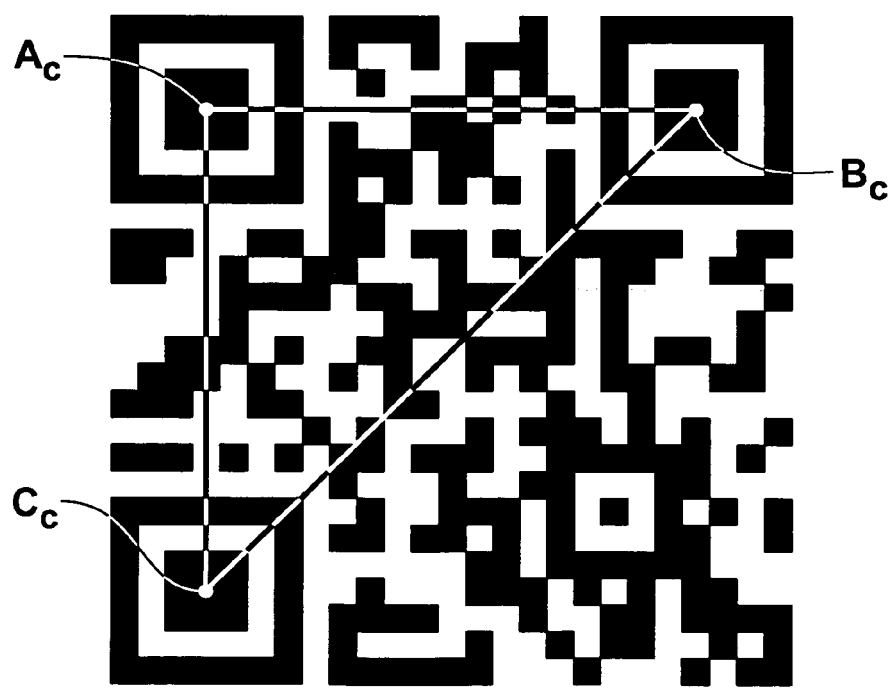
FIG. 14 is a diagram showing line segments connecting center points of QR-Code symbol finder patterns.

A particular embodiment has been described above with reference to the Figures. Those of skill in the art will however appreciated that variations can be made. For example, FIG. 8 illustrates an alternative method for identifying the top left finder pattern, and can be employed in place of steps 310 to 316 in the flowchart of FIG. 7. This method exploits the fact that lines connecting the three finder pattern centers form a right-angled triangle, as shown in FIG. 14, and employs the Pythagorean theorem. During this alternative method, the center of each finder pattern is located and labeled respectively $A_c$, $B_c$, and $C_c$ (step 318). Lines connecting each of centers $A_c$, $B_c$ and $C_c$ are then created (step 320), and the lengths of each line are obtained. If the sum of the squared lengths of the lines extending between centers $A_c$ and $B_c$ and $A_c$ and $C_c$ equal the squared length of the line extending between centers $B_c$ and $C_c$ (step 322), then $A_c$ is the center of the top left finder pattern (step 324) since $A_c$ is at the vertex across from the triangle's hypotenuse. If not, then if the sum of the squared lengths of the lines extending between centers $B_c$ and $C_c$ and $A_c$ and $C_c$ equal the squared length of the line extending between centers $A_c$ and $B_c$ (step 326), then center $C_c$ is the center of the top left finder pattern (step 328) since $C_c$ is at the vertex across from the triangle's hypotenuse. If not, then if the sum of the squared lengths of the lines extending between centers $B_c$ and $C_c$ and $A_c$ and $B_c$ equal the squared length of the line extending between centers $A_c$ and $C_c$ (step 322), then $B_c$ is the center of the top left finder pattern (step 324) since $B_c$ is at the vertex across from the triangle's hypotenuse. If not, then an error is declared as the centers are not arranged to form a right angled triangle.

In the embodiments described above, the confirmation of the labeling of finder patterns B and C is achieved by rotating the top right finder pattern counterclockwise about the top left finder pattern and determining if it is closer to the bottom left finder pattern. Those of skill in the art will however appreciate that the direction of rotation is arbitrary. The top right finder pattern can be rotated clockwise and a check made to determine if it is farther from the bottom left finder pattern. Likewise, the bottom left finder pattern can be rotated about the top left finder pattern and its relative distance to the top right finder pattern examined to confirm the finder pattern labeling.

Although embodiments have been described, those of skill in the art will appreciate that variations and modifications may be made without departing from the spirit and scope thereof as defined by the appended claims.

APPENDIX A

```
input : Grayscale image, Img
output: Threshold value
RowStepSize = ImageHeight /10
ColumnStepSize = ImageWidth /10
PixelSum = 0
NumPixel = 0
for row = 1 to ImageHeight increment by RowStepSize do
    for col = 1 to ImageWidth increment by ColumnStepSize do
        PixelSum = PixelSum + Img[row][col]
        NumPixel = NumPixel + 1
    end
end
ThresholdValue = PixelSum / NumPixel
```

APPENDIX B

```
input : Thresholded Image, Img
 1  for row = 1 to Height do
 2     {TokenArray, numTokens} = RowWiseTokenize(Img, row)
 3     if numTokens >= 5 then
 4        for tokIdx = 1 to numTokens – 5 do
 5           if TokenArray[tokIdx].nColor != 0 then
 6              continue
 7           end
 8           TotalWidth = 0
 9             for idx = nTokIdx to nTokIdx + 5 do
10                TotalWidth=TotalWidth+TokenArray[idx].width
11             end
12             t1 = TokenArray[nTokIdx].width / TotalWidth
13             t2 = TokenArray[nTokIdx + 1].width / TotalWidth
14             t3 = TokenArray[nTokIdx + 2].width / TotalWidth
15             t4 = TokenArray[nTokIdx + 3].width / TotalWidth
16             t5 = TokenArray[nTokIdx + 4].width / TotalWidth
17             if 0.09<=t1,t2,t4,t5 >= 0.19 and 0.32 <= t3 >= 0.52 then
18                  col=(TokenArray[nTokIdx+2]. startX+
                       TokenArray[nTokIdx+2].endX) div2
19                  Find the column wise width of current token.
20                  Find 2 Tokens column wise along column number col above
current token
21                  Find 2 Tokens column wise along column number col below
current token
22                  Repeat Steps 8 to 16.
23                  if 0.09 <= t1,t2,t4,t5 >= 0.19 and 0.32 <= t3 >= 0.52 then
24                      rc = row-wise center of the middle token.
25                      cc = column-wise center of the middle token.
26                      if {rc, cc}in CandidateList, increment its confidence
level by 1.
27                      otherwise, insert {rc, cc} to CandidateList.
28                  end
29              end
30         end
31  end
32 end
```

What is claimed is:

1. A method of extracting a bitstream from a machine-readable symbol in an image, the symbol comprising three finder patterns adjacent respective corners of the symbol and generally defining the corners of a right-angled triangle, the method comprising:

using one or more computer processing units to perform the following:

identifying the finder patterns in the symbol;

orienting the symbol using the finder patterns, the orienting comprising determining which of the three finder patterns is positioned at the corner of the triangle opposite its hypotenuse ("top left finder pattern" ), and labeling the remaining two finder patterns based on the relative distance between the remaining two finder patterns that would result if one of the remaining two finder patterns were rotated about the top left finder pattern less than 180 degrees, wherein the labeling comprises:

initially labeling the remaining two finder patterns respectfully as top right and bottom left finder patterns;

rotating a selected one of the top right and bottom left finder patterns about the top left finder pattern; and after rotation, comparing the relative distance between the top right and bottom left finder patterns before and after rotation to verify the initial labeling;

on the basis of the orienting, delineating the symbol, wherein the delineating comprises:

determining the top left bottom left, and top right corners of the symbol based on the top left bottom left and top right finder patterns; and using a skew and pitch sensitive technique based on the top right and bottom left finder patterns to determine the bottom right corner of the symbol;

mapping a decoding grid to the delineated symbol; and extracting bit values from the mapped symbol.

2. The method of claim 1, wherein during the labeling the top right finder pattern is rotated counterclockwise about the top left finder pattern and its position examined to determine if the top right finder pattern is farther from the bottom left finder pattern; and in the event that the top right finder pattern is farther from the bottom left finder pattern, deeming the remaining two finder patterns correctly labeled.

3. The method of claim 1, wherein during the labeling the bottom left finder pattern is rotated counterclockwise about the top left finder pattern and its position examined to determine if the bottom left finder pattern is closer to the top right finder pattern; and in the event that the bottom left finder pattern is closer to the top right finder pattern, deeming the remaining two finder patterns correctly labeled.

4. The method of claim 1, wherein during the labeling the bottom left finder pattern is rotated clockwise about the top left finder pattern and its position examined to determine if the bottom left finder pattern is farther from the top right finder pattern; and in the event that the bottom left finder pattern is farther from the top right finder pattern, deeming the remaining two finder patterns correctly labeled.

5. The method of claim 1, wherein during the labeling the top right finder pattern is rotated clockwise about the top left finder pattern and its position examined to determine if the top right finder pattern is closer to the bottom left finder pattern;

and in the event that the top right finder pattern is closer to the bottom left finder pattern, deeming the remaining two finder patterns correctly labeled.

6. The method of claim 1, further comprising reversing the labeling if the comparing does not verify the initial labeling.

7. The method of claim 1, wherein the determining comprises:
establishing a plurality of line segments each extending between corresponding points on each of the finder patterns; and
identifying the top left finder pattern as the finder pattern that is common to the corresponding points having line segments extending over only white pixels.

8. The method of claim 7, wherein the image is tokenized into black or white tokens, and wherein the finder pattern common to two of the line segments that pass through only one white token is identified as the top left finder pattern.

9. The method of claim 7, wherein said points are the midpoints of the finder pattern edges.

10. The method of claim 1, wherein the determining comprises:
calculating respective lengths of line segments extending between center points of each of the three finder patterns; and
identifying the top left finder pattern as the finder pattern common to the two line segments that have a squared length sum that equals the square of the length of the third line segment.

11. The method of claim 10, wherein the skew and pitch sensitive technique comprises:
determining a first inside edge line that is collinear with the inside edge of the bottom left finder pattern that faces the top left finder pattern;
determining a second inside edge line that is collinear with the inside edge of the top right finder pattern that faces the top left finder pattern;
determining a first midpoint of the outside edge of the bottom left finder pattern that is opposite the inside edge of the bottom left finder pattern;
determining a second midpoint of the outside edge of the top right finder pattern that is opposite the inside edge of the top right finder pattern;
determining a first outside edge point along the first inside edge line that coincides with an outside edge of the symbol;
determining a second outside edge point along the second inside edge line that coincides with an outside edge of the symbol;
determining a first outside edge line passing through the first midpoint and the second outside edge point;
determining a second outside edge line passing through the second midpoint and the first outside edge point; and
declaring the intersection of the first outside edge line and the second outside edge line to be the bottom right corner.

12. The method of claim 1, wherein the determining the first outside edge point comprises:
defining a first set of test points along the first inside edge line between the intersection point of the first inside edge line and the second inside edge line and an arbitrary point outside of the symbol;
beginning with the test point nearest the intersection point, defining a line segment extending from the second midpoint to the test point;
examining if the line segment passes through only white pixels; and
in the event that the line segment passes through only white pixels, deeming the test point as the first outside edge point; otherwise selecting the next test point and repeating the line segment defining and examining.

13. The method of claim 12, wherein the determining the second outside edge point comprises:
defining a second set of test points along the second inside edge line between the intersection point of the first inside edge line and the second inside edge line and an arbitrary point outside of the symbol;
beginning with the test point nearest the intersection point, defining a line segment extending from the first midpoint to the test point;
examining if the line segment passes through only white pixels; and
in the event that the line segment passes through only white pixels, deeming the test point as the second outside edge point, otherwise selecting the next test point and repeating the line segment defining and examining.

14. The method of claim 1, wherein said skew and pitch sensitive technique comprises:
determining bottom and right side symbol edge points adjacent the bottom right corner of said symbol; and
determining the intersection of a line extending from the bottom left finder pattern through the bottom symbol edge point and a line extending from the top right finder pattern through the right side symbol edge point thereby to determine the bottom right symbol corner.

15. The method of claim 1, wherein the two-dimensional machine-readable symbol is a QR-Code symbol.

16. A computer readable medium embodying a computer program executable by the computer for performing the method of claim 1.

17. An apparatus for extracting a bitstream from a machine-readable symbol in an image, the symbol comprising three square finder patterns adjacent respective corners of the symbol and generally defining the corners of a right-angled triangle, the apparatus comprising:
a finder pattern identifier identifying the finder patterns in the symbol;
a symbol orientor orienting the symbol using the finder patterns, the orienting comprising determining which of the three finder patterns is positioned at the corner of the triangle opposite its hypotenuse ("top left finder pattern"), and labeling the remaining two finder patterns based on the relative distance between the remaining two finder patterns that would result if one of the remaining two finder patterns were rotated about the top left finder pattern less than 180 degrees, wherein the labeling comprises:
initially labeling the remaining two finder patterns respectfully as top right and bottom left finder patterns;
rotating a selected one of the top right and bottom left finder patterns about the top left finder pattern; and
after rotation, comparing the relative distance between the top right and bottom left finder patterns before and after rotation to verify the initial labeling;
a symbol delineator for, on the basis of the orienting, delineating the symbol, wherein the delineating comprises:
determining the top left, bottom left, and top right corners of the symbol based on the top left, bottom left and top right finder patterns; and using a skew and pitch sensitive technique based on the ton right and bottom left finder patterns to determine the bottom right corner of the symbol;

a reference grid calculator for mapping a reference decoding grid to the delineated symbol; and a bit extractor for extracting bit values from the mapped symbol.

* * * * *

UNITED STATES PATENT AND TRADEMARK OFFICE
CERTIFICATE OF CORRECTION

PATENT NO. : 7,546,950 B2  
APPLICATION NO. : 11/390653  
DATED : June 16, 2009  
INVENTOR(S) : Mohanaraj Thiyagarajah Page 1 of 1

It is certified that error appears in the above-identified patent and that said Letters Patent is hereby corrected as shown below:

Column 33

Line 2, please change "ton right" to --top right--.

Signed and Sealed this

Twenty-fifth Day of August, 2009

David J. Kappos  
*Director of the United States Patent and Trademark Office*